United States Patent
Kondo

(10) Patent No.: US 8,220,153 B2
(45) Date of Patent: Jul. 17, 2012

(54) PRODUCTION METHOD FOR COMPLEX BEARING

(75) Inventor: Makoto Kondo, Matsudo (JP)

(73) Assignee: Hitachi Powdered Metals Co., Ltd., Matsudo-shi (JP)

( * ) Notice: Subject to any disclaimer, the term of this patent is extended or adjusted under 35 U.S.C. 154(b) by 1241 days.

(21) Appl. No.: 11/802,394

(22) Filed: May 22, 2007

(65) Prior Publication Data

US 2007/0271789 A1    Nov. 29, 2007

(30) Foreign Application Priority Data

May 26, 2006 (JP) .................................. 2006-147235
Jul. 19, 2006 (JP) .................................. 2006-196727

(51) Int. Cl.
*B21D 53/28* (2006.01)

(52) U.S. Cl. ... 29/893.37; 29/893; 29/893.3; 29/893.34; 29/898.14; 29/521; 29/525

(58) Field of Classification Search ............. 29/893, 29/893.2, 893.3, 893.4, 893.1, 893.33, 893.34, 29/893.37, 898.07, 898.13, 898.14, 521, 29/525; 74/460

See application file for complete search history.

(56) References Cited

U.S. PATENT DOCUMENTS

| | | | | |
|---|---|---|---|---|
| 5,453,242 | A * | 9/1995 | Knoess | 419/27 |
| 5,704,718 | A * | 1/1998 | Mori et al. | 384/279 |
| 6,049,983 | A * | 4/2000 | Miyasaka et al. | 29/898.057 |
| 6,361,737 | B1 * | 3/2002 | Miyasaka et al. | 419/2 |
| 6,789,320 | B2 * | 9/2004 | Mori et al. | 29/898.02 |
| 7,014,677 | B2 * | 3/2006 | Takiguchi et al. | 75/243 |
| 7,059,052 | B2 * | 6/2006 | Okamura et al. | 29/898.02 |
| 7,416,696 | B2 * | 8/2008 | Kosco | 419/28 |

(Continued)

FOREIGN PATENT DOCUMENTS

JP    U 61-139349    8/1986

(Continued)

OTHER PUBLICATIONS

Machine translation of JP2001-056028; Feb. 27, 2001.*

(Continued)

*Primary Examiner* — David Bryant
*Assistant Examiner* — Ryan J Walters
(74) *Attorney, Agent, or Firm* — Oliff & Berridge, PLC

(57) ABSTRACT

A production method for complex bearings includes: preparing an outer member and a cylindrical sintered bearing member. The outer member includes a fitting hole having: an almost circular cross section; an inner peripheral surface; and a surface roughness of the inner peripheral surface which is 3.2 to 100 μm at a maximal height. The sintered bearing member includes: an outer diameter allowing clearance fit of the sintered bearing member into the fitting hole of the outer member. The production method further includes: inserting the sintered bearing member into the fitting hole of the outer member and inserting a columnar core rod into an inner peripheral surface of the sintered bearing member; and compressing the sintered bearing member in an axial direction. By the compressing, an expanding peripheral surface of the sintered bearing member is pressed onto the inner peripheral surface of the fitting hole of the outer member, and the outer member and the sintered bearing member are thereby integrated with each other, and the inner peripheral surface of the sintered bearing member is pressed onto the core rod, and a hole size of the fitting hole of the sintered bearing member is thereby adjusted.

12 Claims, 9 Drawing Sheets

U.S. PATENT DOCUMENTS

2004/0177719 A1* 9/2004 Kosco .............................. 75/246
2007/0283778 A1* 12/2007 Ichikawa et al. ................ 74/457

FOREIGN PATENT DOCUMENTS

| JP | A-05-344675 | 12/1993 |
| JP | A 07-238880 | 9/1995 |
| JP | A 07-332363 | 12/1995 |
| JP | A 09-096314 | 4/1997 |
| JP | 10317090 A * | 12/1998 |
| JP | A-2001-056028 | 2/2001 |
| JP | A 2004-316926 | 11/2004 |
| JP | B 3686665 | 6/2005 |
| JP | A-2006-052757 | 2/2006 |

OTHER PUBLICATIONS

Japanese Office Action issued in Japanese Patent Application No. 2006-196727 dated Sep. 2, 2010 (with translation).

Mar. 18, 2011 Office Action issued in Japanese Patent Application No. 2006-147235 (with English Translation).

* cited by examiner

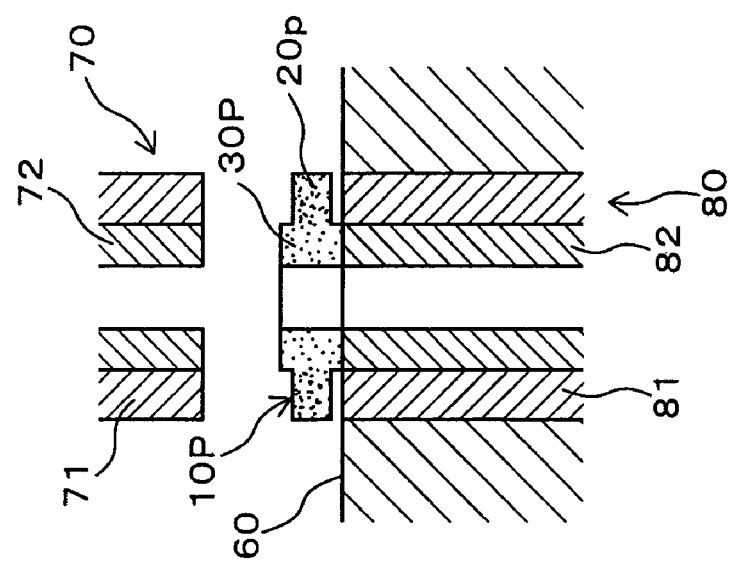
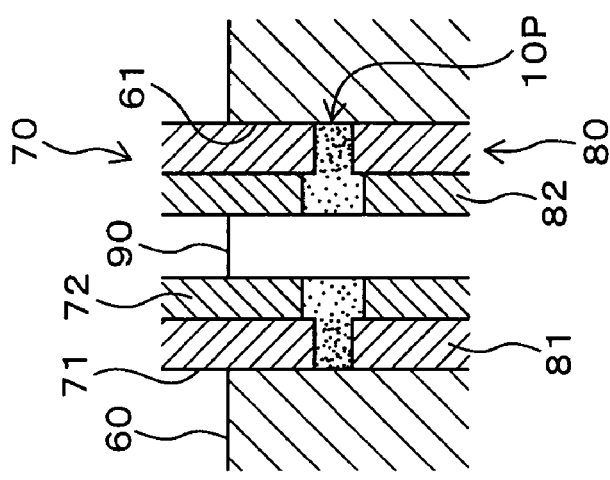
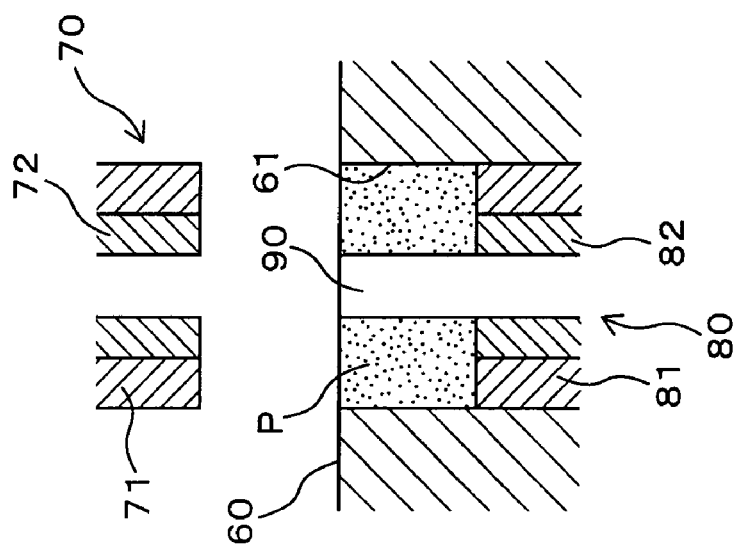

PRODUCTION METHOD FOR COMPLEX BEARING

BACKGROUND OF THE INVENTION

1. Field of the Invention

The present invention relates to a production method for complex bearings which are equipped with a cylindrical sintered bearing member and a cylindrical outer member into which the sintered bearing member is integrally fitted. For example, the complex bearings are bearing complex gears (for example, planetary gears) and bearing units. Each bearing complex gear is equipped with a sintered bearing member and a gear member (outer member) having a center hole into which the sintered bearing member is fitted. Each bearing unit is equipped with a sintered bearing member and a housing (outer member) into which the sintered bearing member is fitted and fixes.

2. Description of the Related Art

A planetary gear moves around a sun gear while engaging with the sun gear and rotating on its rotational axis. Since the planetary gear engages with the sun gear and transmits a power thereto, it is required to have a corresponding strength. In addition, it is required to have a low friction to the rotational axis and have a good sliding property thereto. Thus, in order to improve a sliding property of a planetary gear to a rotational axis, for example, Japanese Examined Utility Application Publication No. S61-139349 has proposed a method in which a bearing member of oil-impregnated alloy member is fitted into a gear member which is used as a peripheral portion having teeth formed thereat. The oil-impregnated alloy member may be an oil-impregnated sintered alloy.

A sintered alloy made by powder metallurgy is easily formed into a near net shape at relatively low cost, thereby being used as a material of planetary gear. In the above combination of the gear member and the bearing member, sintered alloys are made by selecting raw materials, density ratios, sintered conditions, and the like, based on required properties of the respective members, and they are used such that a Fe-based sintered alloy superior in strength property is used for the gear member and an oil-impregnated sintered bearing is used for the bearing member. As a result, a planetary gear is produced. In the planetary gear, it is necessary to strongly integrate the gear member and the bearing member with each other. However, when an adhesive material is used for adhesion of the members, since the adhesive material is absorbed in pores of the members, the adhesion of the members cannot be strong. Thus, a method proposed by Japanese Unexamined Patent Application Publication No. H7-238880 has been conceived to be advantageous, in which a bearing member is press-fitted into a center hole of a gear member.

FIGS. 13A and 13B show one example of production method for obtaining a planetary gear by fitting a sintered member into a bearing member. In this method, first, as shown in FIG. 13A, a gear member 301 is mounted onto a die 402 into which a columnar core rod 401 is slidably inserted. An upper end portion of the core rod 401 penetrates a fitting hole 301a which is formed at a center of the gear member 301 and has a circular cross section. A cylindrical bearing member 302 is fitted into an upper end portion of the core rod 401 which projects from the gear member 301. In this case, the bearing member 302 has an outer diameter which is slightly larger than an inner diameter of the fitting hole 301a and thereby allows interference fitting of the bearing member 302 into the gear member 301. Next, as shown in FIG. 13B, the bearing member 302 is pressed into the fitting hole 301a of the gear member 301 by a cylindrical punch 403. The bearing member 302 is guided by the core rod 401, and is press-fitted into the fitting hole 301a of the bearing member 301, so that a peripheral surface of the bearing member 302 tightly contacts an inner peripheral surface of the fitting hole 301a. As a result, the gear member 301 and the bearing member 302 are integrated with each other. In addition, the inner peripheral surface of the bearing member 302 tightly contacts the core rod 401, so that an inner diameter of the bearing member 302 is adjusted.

In the combination method by the press-fitting as shown in FIGS. 13A and 13B, as shown in FIG. 14B, the peripheral surface of the bearing member 302, which is press-fitted into the gear member 301, is cut by an upper edge of the fitting hole of the gear member 301, so that burrs 302a are often generated. Due to this, it is necessary to remove the burrs 302a. In addition, since the peripheral surface of the bearing member 302 flows in the above manner, the contact area of the peripheral surface of the bearing member 302 with respect to the inner peripheral surface of the fitting hole of the gear member 301 decreases, and the degree of contact is deteriorated. Thus, the expected fixing strength cannot be obtained. Due to this insufficient fixing strength of the bearing member 302 with respect to the gear member 301, slip between the members 301 and 302 occurs in practical use as a gear, and a problem occurs in transmission of force.

An oil-impregnated sintered bearing, which is made from a porous sintered alloy and has lubricating oil impregnated thereinto, can be used without oil supplying for a long time period, it is superior in durability at high temperatures, and it generates low noise. Therefore, instead of a ball bearing, the oil-impregnated sintered bearing has been widely used as a bearing for a rotational shaft. For example, in spindle motors (which are used in information devices) and fan motors, the above oil-impregnated sintered bearing is fitted and fixes into a housing which is composed of a cut product of ingot material (for example, brass and stainless) or is composed of a die-cast product of Zn or Al. As a result, the oil-impregnated sintered bearing and the housing are assembled as a bearing unit. Next, lubricating oil is impregnated into pores formed in the bearing unit, and it is held therein. Thus, an oil film is formed between an inner peripheral surface of shaft hole and a rotational shaft which is slidably inserted into the shaft hole, and lubricating condition therebetween can be maintained for a long time period (see FIGS. 2 and 1 of Japanese Unexamined Patent Application Publication No. H9-96314, FIGS. 4, 5, 6 and 1 of Japanese Unexamined Patent Application Publication No. H7-332363, and FIG. 1 of Japanese Patent No. 3686665).

In the above bearing unit, when the degree of contact of the bearing member with respect to the housing is insufficient, the bearing member (oil-impregnated sintered bearing) may project from the housing, and it may fall therefrom. Due to this, the fitting hole of the housing, into which the bearing member is fitted, is machined to have a high size precision and a small surface roughness in order to improve close contact of the fitting hole of the housing and the peripheral surface of the bearing member. When an adhesive material is used as a method in which the bearing member fixes in the housing, the adhesive material is absorbed in pores of the bearing member, so that strong fixation cannot be obtained. Therefore, a method for press-fitting of the bearing member into the housing is conceived to be advantageous.

In order to press-fit a bearing member into a housing, for example, a die apparatus shown in FIGS. 15A and 15B is used. The die apparatus is equipped with a die 590, a core rod 591, upper and lower compression punches 592 and 593, and a supporting punch 594. The die 590 has a cylindrical die hole 590a into which a housing 580 is fitted. The core rod 591 is disposed at a center of the die hole 590a of the die 590. The upper and lower compression punches 592 and 593 are used for compressing a sintered bearing member 585 of a sintered compact which is inserted into the housing 580. The supporting punch 594 supports the housing 580. The housing 580 is cylindrical and has a fitting hole 580a which is formed at a center thereof and into which the sintered bearing 585 is fitted. The cylindrical bearing member 585 before press-fitting has an outer diameter which is slightly larger than an inner diameter of the housing 580 (that is, diameter of the fitting hole 580a) and thereby allows interference fitting of the bearing member 585 into the housing 580. A shaft hole 585a has an inner diameter allowing insertion of the core rod 591 into the shaft hole 585a by sliding.

As shown in FIG. 15A, the bearing member 585 is coaxially disposed above the core rod 591. As shown in FIG. 15B, while the bearing member 585 is guided by the core rod 591 which slides on the shaft hole 585a and is inserted thereinto, the bearing member 585 is pressed into the fitting hole 580a of the housing 580 by the upper punch 592. As a result, a bearing unit is obtained. The bearing member 585 is press-fitted into housing 580, so that a peripheral surface 580a of the bearing member 585 tightly contacts an inner peripheral surface 580a of the housing 580. As a result, the housing 580 and the bearing member 585 are integrated with each other. In addition, the inner peripheral surface of the bearing member tightly contacts the core rod, so that an inner diameter thereof is adjusted.

In the method as shown in FIGS. 15A and 15B, the degree of contact of the bearing member 585 with respect to the housing 580 is uneven, and the fixing strength may be low at a portion thereof. According to analysis of the reason by the inventors, as shown in FIGS. 16A and 16B, the peripheral surface of the bearing member 585 fitted into the housing 580 is cut by an upper edge of the fitting hole 580a of the housing 580, so that burrs 302a are generated. In addition, since the peripheral surface of the bearing member 585 is cut, the contact area of the peripheral surface of the bearing member 585 with respect to the inner peripheral surface of the fitting hole 580a decreases.

Japanese Patent No. 3686665 has proposed a method in which a sintered bearing member, which has an outer diameter slightly smaller than a diameter of fitting hole of housing, is fitted into the housing in a clearance fit condition, an adhesive material is filled between the sintered bearing member and the housing, and they fix to each other. In particular, this method is characterized in that impregnation of resin into pores of the sintered bearing member is performed, the pores are sealed, an inner portion unit is subjected to vacuum suction, and the adhesive material, which falls in drops at end portion of the clearance, reach the overall of the clearance. However, in this method, since the pores of the sintered bearing member are sealed by the resin impregnation, the fixing property is good, but oil film formation action, which caused by lubricating oil supplying from the pores of the oil-impregnated sintered bearing, is deteriorated. Due to this, it is difficult to use this method for typical bearing units.

SUMMARY OF THE INVENTION

An object of the present invention is to provide a production method for complex bearings which are equipped with an outer member and a sintered bearing member which is integrally fitted and fixes into the outer member, wherein the production method can reduce unevenness of fixing strength of the sintered bearing to the outer member, can improve the fixing strength higher than conventional techniques, and easily obtain the complex bearings at lower cost. For example, as described above, the complex bearing is a planetary gear having a gear member as the outer member, or a bearing unit having a housing as the outer member.

According to one aspect of the present invention, a production method for complex bearings includes: preparing an outer member and a cylindrical sintered bearing member. The outer member includes a fitting hole having: an almost circular cross section; an inner peripheral surface; and a surface roughness of the inner peripheral surface which is 3.2 to 100 µm at a maximal height. The sintered bearing member includes: an outer diameter allowing clearance fit of the sintered bearing member into the fitting hole of the outer member. The production method further includes: inserting the sintered bearing member into the fitting hole of the outer member and inserting a columnar core rod into an inner peripheral surface of the sintered bearing member; and compressing the sintered bearing member in an axial direction. By the compressing, an expanding peripheral surface of the sintered bearing member is pressed onto the inner peripheral surface of the fitting hole of the outer member, and the outer member and the sintered bearing member are thereby integrated with each other, and the inner peripheral surface of the sintered bearing member is pressed onto the core rod, and a hole size of the fitting hole of the sintered bearing member is thereby adjusted. In the present invention, maximal height of surface roughness is denoted by a maximal interval between a peak portion and a valley portion of roughness curve. In this case, an extraordinarily high peak and an extraordinarily low valley which are caused by damages are not used in evaluation of the surface roughness. When the outer member is composed of a sintered material as described below, the surface roughness is evaluated without using a pore portion.

In the production method of the present invention, the sintered bearing member is not press-fitted into the fitting hole of the outer member, but the sintered beating member has the outer diameter which is slightly smaller than the inner diameter of the fitting hole, thereby being fitted into the fitting hole of the outer member in a clearance fit condition. Then, the sintered bearing member is compressed in the axial direction. By the compression, plastic flow occurs in the sintered bearing member such that a material of the sintered bearing member flows toward the peripheral side thereof. The peripheral surface of the sintered bearing member is pressed onto the inner peripheral surface of the fitting hole of the outer member, and the peripheral surface tightly contacts the inner peripheral surface, so that the sintered bearing member and the outer member are integrated with each other.

In the production method of the present invention, since the sintered bearing member is not press-fitted, cut of the peripheral surface of the bearing member shown in FIGS. 14B and 16B can be prevented, so that a burr removal process is unnecessary. Since the inner peripheral surface of the fitting hole of the outer member has the surface roughness of 3.2 to 100 µm at a maximal height and is relatively rough, the peripheral surface of the sintered bearing member can plastically deform and it can flow into the convexoconcaves of the rough inner peripheral surface of the fitting hole of the outer member. Thus, the convexoconcave fitting of the peripheral surface of the sintered bearing member into the inner peripheral surface of the fitting hole of the outer member is performed without a clearance formed therebetween, and contact area thereof increases, so that the fixing strength can be high. Therefore, slip between the outer member and the sintered bearing member can be prevented in practical use, and the fixing strength of the sintered bearing member to the outer member can be reliably ensured for a long time period. In addition, since the resistance which is generated in pressure application between the outer member and the sintered bearing member is small in comparison with the press-fitting, a load required in pressure application can be reduced and a load to a pressure application apparatus can be reduced.

In the production method of the present invention, the sintered bearing member plastically deforms and integrally fixes to the inner peripheral surface of the fitting hole of the outer member, and the inner peripheral surface of the shaft hole of the sintered bearing member tightly contacts the core rod which is inserted thereinto, so that the hole size of the shaft hole is adjusted. Thus, the shaft hole has a cylindrical shape having a constant inner diameter. In this case, even when the fitting hole of the outer member is lower in a circular degree or is eccentric, the sintered bearing member deforms in accordance with this, so that the hole size of the shaft hole and the concentric degree thereof are adjusted by the compression of the sintered bearing member by the core rod. Therefore, machining of the outer member and the sintered member for adjusting of the hole size and the concentric degree thereof is unnecessary, so that the number of processes does not increase. In addition, the shaft hole of the sintered bearing member is formed with high size precision, and it is concentric with the outer member.

In order that the high fixation of the sintered bearing member into the outer member be obtained such that the peripheral surface of the sintered bearing member sufficiently flow into the rough inner peripheral surface of the fitting hole of the outer member, the inner peripheral surface of the fitting hole should have a surface roughness of 3.2 to 100 µm at a maximal height. As described above, the maximal height of surface roughness is denoted by a maximal interval between a peak portion and a valley portion of roughness curve. In this case, an extraordinarily high peak and an extraordinarily low valley which are caused by damages are not used in evaluation of the surface roughness. In the production method of the present invention, if the maximal height of the surface roughness of the fitting hole of the outer member is less than 3.2 µm and the convexoconcaves are too shallow, the fixing strength of the peripheral surface of the tightly contacting sintered bearing member after the plastic deformation is insufficient. On the other hand, if the maximal height is more than 100 µm and the convexoconcaves are too deep, the sintered bearing member cannot sufficiently flow into the convexoconcaves and cannot be sufficiently inserted into the concave. Due to this, the contact area does not increase much, and the fixing strength decreases. Therefore, the surface roughness of the fitting hole of the outer member is 3.2 to 100 µm at a maximal height.

In the sintered bearing member of the present invention, the sintered bearing member may function as an oil-impregnated sintered bearing in which lubricating oil is held for securing a sliding property thereof after the fixation thereof to the outer member, and the deformability may be provided to the sintered bearing member. In order to achieve these, the sintered bearing member may have a porosity of 5 to 30%. When the porosity exceeds 30%, it may be difficult to handle the compact (sintered compact), and breakage may occur in the compact, so that this case is not desirable. On the other hand, when the porosity is less than 5%, the amount of the pores remaining after the fixation to the outer member may be insufficient, and the sliding property cannot be good, so that this case is not desirable. Therefore, the porosity of the sintered bearing member may be 5 to 30%.

In order that the sintered bearing member be compressed and plastically deform so as to be fixed to the inner peripheral surface of the fitting hole, the following conditions may be necessary. That is, when the clearance between the inner peripheral surface of the fitting hole and the peripheral surface of the sintered bearing member may be too large even in the clearance fit condition, the plastic deformation amount of the sintered bearing member may be too large, and it may be difficult to maintain the size precision after the deformation. In addition, when the plastic deformation insufficiently occurs, degree of contact of the sintered bearing member with respect to the inner peripheral surface of the fitting hole may be relatively weak, and the fixing strength may be insufficient. Due to this, the fitting size difference between the inner diameter of the fitting hole of the outer member and the outer diameter of the sintered bearing member, that is, the clearance therebetween should be 300 µm or less. Since the clearance fit of the sintered bearing member into the fitting hole of the outer member may be performed, the clearance may exceed 0.

The outer member of the present invention can use cut products of ingot material (for example, brass or stainless) or die cast products of Zn or Al. For example, a technique for roughening the inner peripheral surface of the fitting hole may be one in which cut marks are formed by cutting. Specifically, spiral cut marks may remain by controlling a cutting depth and moving speed of a cutting edge used in cutting. In practical use of the fitting hole of the outer member, since the inner peripheral surface thereof is maintained rough in the above manner, finishing of the inner peripheral surface may be unnecessary, so that the production cost can be reduced.

In the production method of the present invention as described above, since the oil-impregnated bearing is used as the sintered bearing member, the sliding property of the bearing surface, that is, the sliding property of the inner peripheral surface of the sintered bearing member can be ensured. Since the strength of the sintered bearing member is lower than that of the outer member, as described above, the peripheral surface of the sintered bearing member can flow into the rough inner peripheral surface of the fitting hole of the outer member. Therefore, the above ingot material, which is harder than the sintered bearing material and has the strength higher than that of the sintered bearing material, can be used as the material of the outer member. Instead of this, the outer member may be composed of a sintered material.

When the outer member is composed of a sintered material, the outer member can be produced with a high precision at a lower cost. In this case, from a view point of ensuring the strength, in particular, the sintered material is desirably Fe-based. Since the sintered material has convexoconcaves on a surface thereof due to a production method using a metal powder as a raw material, the inner peripheral surface of the fitting hole can be a concavoconvex surface by using this, so that another special processing can be unnecessary. In the outer member of the sintered material, in order that the inner peripheral surface of the fitting hole be a concavoconvex surface, the inner peripheral surface of the fitting hole of the outer member may be in a condition obtained by sintering without sizing on the inner peripheral surface, the sizing causing plastic deformation thereto.

When the outer member is composed of the Fe-based sintered material, sizes of pores on the inner peripheral surface of the outer member and pores thereof at a region which is a predetermined distance deep from the surface thereof may be smaller than those of other portions of the outer member. On the other hand, sizes of pores of the sintered bearing member may be smaller than those of the inner peripheral surface of the outer member. Therefore, the portions of the large pores of the outer member can effectively obtain effects of holding lubricating oil and of supplying the lubricating oil to the sintered bearing member. In a case in which the complex bearing of the present invention acts (that is, rotates) in a condition that the shaft is relatively slidably and rotatably inserted into the sintered bearing member, the lubricating oil of the sintered bearing member may flow to the large pores of the outer member on the inner peripheral surface thereof so that the outer member functions as a oil reservoir, when the lubricating oil thermally expands in accordance with temperature rising of the inner peripheral surface of the sintered bearing member which is a sliding surface sliding on the shaft. In addition, in a case in which the complex bearing of the present invention stops the action (that is, rotation), the lubricating oil held in the outer member can return to the sintered bearing member by capillary force.

In order that the outer member perform the above lubricating oil holding function, the outer member may have pores with a maximal pore diameter of 50 to 200 µm at a depth of at least 2 mm from the inner peripheral surface of the fitting hole of the outer member, and amount of the pores may be 5 to 30% of overall pores of the outer member. On the other hand, the sintered bearing member may have pores with a maximal pore diameter of 5 to 100 µm, and amount of the pores may be 5 to 50% of overall pores of the sintered bearing member. Therefore, the above good actions of absorption and supply of lubricating oil can be obtained.

In order to control a pore diameter of the outer member of a Fe-based sintered material, for example, a Cu powder having a particle diameter of about 100 to 300 µm, which is relatively coarse, is added to a Fe powder which is a raw material thereof. Alternatively, for example, a Fe powder, which has a particle diameter distribution such that amount of a fine powder is small and amount of coarse powder is large, is used. In the former case using the above Cu powder, since the Cu powder is diffused in a Fe base matrix by sintering and it remains as coarse pores which are known as the Kirkendall voids, pores of the outer member may can be coarse by using this. In the latter case using the above Fe powder, bridging of the Fe powder may easily occur, and coarse gaps formed by the bridging after the sintering can remain as coarse pores.

The pore diameter, which is larger or smaller, may not influence directly on a porosity. A porosity of the outer member may be determined based on a desirable strength property thereof, and it is desirably about 5 to 25%. Since the above absorption and supply action of the lubricating oil is generated by capillary force, it may depend on the sizes of pores rather than the amount of the pores. Thus, even when the porosity is about 5 to 25%, the absorption and supply action of the lubricating oil may be good by setting distribution of pore diameter in the above manner. On the other hand, since the amount of absorption and supply of the lubricating oil is determined by the amount of pores, dispersion range of large pores may be expanded, so that the outer member can hold a larger amount of the lubricating oil.

In consideration of using the sintered bearing member, which fixes to the outer member in the above manner, in an oil-impregnated condition, an inner relief portion may be formed at an axial direction center portion of a shaft hole of the sintered bearing member and may have a diameter larger than those of axial direction opposite portions of the sintered bearing member. The lubricating oil may be held in the inner relief portion. This feature may be desirable in the production method of the present invention from a view point of improvement in oil reservoir capacity.

According to one feature of the present invention, the number of the complex bearings is plural. The sintered bearing members may be nearly coaxially fitted into the fitting hole of the outer member, and the sintered bearing members may be compressed so as to tightly contact each other in an axial direction. In this feature, inner diameters of shaft hole end portions (large inner diameter portions) which are proximate to the contact surfaces of the sintered bearing members may be larger than other portions of the sintered bearing members, wherein the larger inner diameter portions form an inner relief portion by contacting them. Therefore, the inner relief portion can be easily formed without large deformation of the sintered bearing members.

For example, the outer member of the present invention is a cylindrical housing. In this case, the complex bearing of the present invention may be a bearing unit. Alternatively, the outer member may be a gear member which has a gear shape as an external shape, and the fitting hole may be formed at a center of the gear shape. In this case, the complex bearing of the present invention may be a bearing complex gear.

In the case of bearing complex gear, the gear member (outer member) may have a tooth portion and a body portion, the tooth portion and the body portion may be integrated, the tooth portion may be required to be strong. The tooth portion may have a density ratio of 80% or more, and the body portion may have a density ratio of 75 to 95% (a porosity of 5 to 25%), so that the above absorption and supply action of the lubricating can be effectively obtained. In this manner, in order that the density ratios of portions in one member be different from each other, plural punches may be used in forming of a green compact before sintering, and compression ratios of the portions in one member may thereby be different from each other in accordance with the portions. Thus, the different density ratios of the portions in one member can be easily obtained. The tooth portion of the gear member or the like may be subjected to processing (for example, sizing) when size correction thereof is necessary.

BRIEF DESCRIPTION OF THE DRAWINGS

FIGS. 2A to 2C are cross sectional views which show a forming method of a green compact of a planetary gear member in order.

DETAILED DESCRIPTION FOR THE INVENTION

One embodiment of the present invention will be explained hereinafter with reference to the drawings.

(1) First Embodiment

Figure 1A:
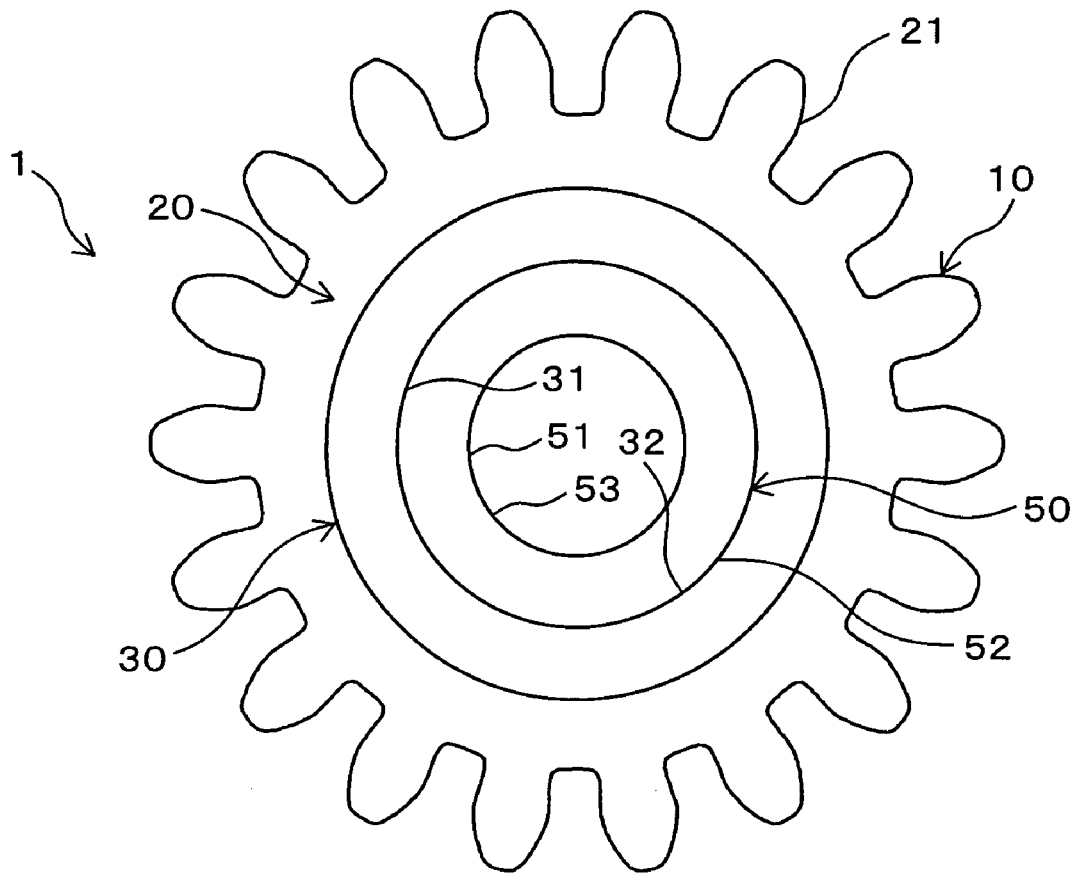
FIGS. 1A and 1B are a plan view and a cross sectional view which show a bearing complex gear produced by a production method of the first embodiment according to the present invention.
Figure 1B:
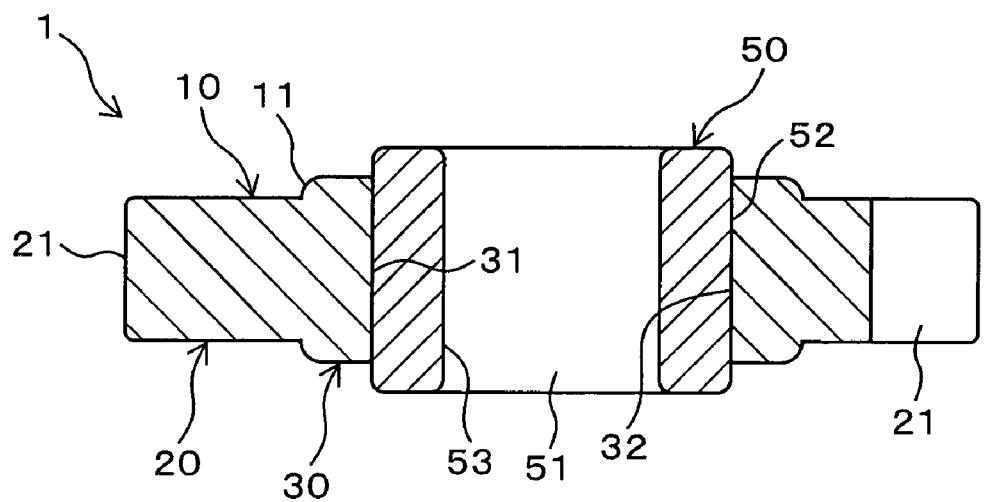

FIG. 1 shows a bearing complex gear (complex bearing, hereinafter referred to as "gear") 1 which is used as a planetary gear or the like produced by a production method of the first embodiment according to the present invention. The gear 1 is equipped with a gear member (outer member) 10 and a sintered bearing member (hereinafter referred to as "sintered member") 50 which integrally fixes inside the gear member 10. In this case, each member 10 and 50 is composed of a sintered material. The gear member 10 is a sintered compact of Fe-based sintered material having a high strength. The bearing member 50 is a sintered compact of Cu-based sintered material having a sliding property and deformability.

The gear member 10 is an annular spur gear member having plural teeth 21 and a fitting hole 31. The teeth 21 are formed at an outer circumferential portion of the gear member 10 at equal intervals in a circumferential direction. The fitting hole 31 is formed at a center of the gear member 10, and the bearing member 50 is fitted thereinto. The gear member 10 has a tooth portion 20 and a cylindrical body portion 30 which are integrally formed. The tooth portion 20 has the plural teeth 21 formed at the outer circumferential portion. The body portion 30 is formed at an inner circumferential side of the tooth portion 20 and is slightly thicker than the teeth portion 20. A step portion 11 extends between the tooth portion 20 and the body portion 30, and has upper and lower surfaces (opposite surfaces) having the same surface heights. That is, the upper side and the lowers side of the gear member 10 are symmetrical in cross section.

The bearing member 50 is a cylindrical member having an axial direction length which is slightly longer than that of the body portion 30 of the gear member 10. The bearing member 50 is coaxially fitted into the fitting hole 31 of the gear member 10. The bearing member 50 has an outer circumferential surface which tightly fixes to an inner circumferential surface 32 of the fitting hole 31. The members 10 and 50 integrally fix to each other, thereby forming the gear 1. The bearing member 50 fixes to the gear member 10 such that a center of the axial direction length of the bearing member 50 corresponds to that of axial direction (thickness) of the gear member 10. Therefore, the upper side and the lower side of the gear 1 are also symmetrical in a cross section. For example, the gear 1 is used as a planetary gear. In this case, a shaft disposed around a sun gear is slidably and rotatably inserted into a hole of the bearing member 50 (that is, a shaft hole 51 of the gear 1), and the teeth 21 of the tooth portion 20 engage with teeth of the sun gear.

Next, a production method of the gear 1 will be explained. First, a gear member 10 and a bearing member 50, which will be fitted thereinto, are prepared. In case of the gear member 10, a raw powder which is a Fe-based sintered material is compacted into a green compact, and the green compact is sintered. As a result, the gear member 10, which has a near net shape similar to a shape thereof when being used in the gear 1, is obtained. In case of the bearing member 50, a raw powder which is a Cu-based sintered material is compacted into a green compact, and the green compact is sintered. As a result, the bearing member 50, which has a near net shape similar to a shape thereof when being used in the gear 1, is obtained. The production method of the first embodiment is a method in which the bearing member 50 is fitted into a fitting hole 31 of the gear member 10 in a clearance fit condition and it is compressed in an axial direction.

In the gear member 10, at least an inner circumferential surface 32 of the fitting hole 31 is in a condition obtained by the sintering, and it has a surface roughness of 3.2 to 100 μm at a maximal height. The gear member 10 has a density ratio of 75 to 95%. In the gear member 10, densities ratio of the tooth portion 20 and the body portion 30 are controlled so as to be different from each other. The tooth portion 20 has a density ratio of 80% or more. The body portion 30 has a density ratio of 75 to 95%.

In order that the tooth portion 20 and the body portion 30 differ from each other in density ratio, it is advantageous that the difference between the density ratios is provided in the forming of the green compact. FIG. 2 shows one example of this method. A die apparatus for compacting is equipped with a die 60, cylindrical upper and lower punches 70 and 80, and a core rod 90. The die 60 has a cylindrical die hole 61. The punches 70 and 80 are inserted into the die hole 61. The core rod 90 is slidably inserted into the punches 70 and 80. The punches 70 and 80 have cylindrical outer punches 71 and 81 which have the same shapes and sizes, and they have cylindrical inner punches 72 and 82 which have the same shapes and sizes. That is, the upper punch 70 has the upper outer punch 71 and the upper inner punch 72, and the lower punch 80 has the lower outer punch 81 and the lower inner punch 82. Each outer punch 71 and 81 is slidably inserted into the die hole 61 of the die 60. Each inner punch 72 and 82 is slidably inserted into each outer punch 71 and 81. The core rod 90 is slidably inserted into each upper and lower inner punch 72 and 82. Each outer punch 71 and 81 is used for forming the tooth portion 20, and each inner punch 72 and 82 is used for forming the body portion 30.

In order to obtain green compacts of the tooth portion 20 and the body portion 30, which have different density ratios, by compacting, first, as shown in FIG. 2A, the lower punch 80, which is inserted into the die hole 61 from the lower side, is positioned at a predetermined depth by aligning upper ends of the inner and outer punches 81 and 82 thereof. An upper end of the core rod 90 inserted into the lower inner punch 82 is aligned with a flat upper surface of the die 60. A cavity is cylindrically partitioned in the die hole 61 by the inner circumferential surface of the die hole 61, the upper end surface of the lower punch 80, and the core rod 90. Next, a raw powder P, which is Fe-based sintered alloy, is filled in the cavity in a struck condition.

Next, as shown in FIG. 2B, the lower outer punch 81 moves upwardly, and the upper punch 70, of which the upper outer punch 71 moves downwardly at the same distance as the upward movement distance of the lower outer punch 81, is inserted into the die hole 61. The raw powder P in the cavity is compacted by the upper and lower punches 70 and 80 in the axial direction, so that a green compact 10P is obtained. In the compressed green compact 10P, a tooth portion with a high compression ratio is formed between the outer punches 71 and 81 of the upper and lower punches 70 and 80, and a body portion with a low compression ratio is formed between the inner punches 72 and 82. After the green compact 10P is obtained by the compacting, as shown in FIG. 2C, the upper punch 70 moves upwardly and is extracted from the die 60, and the lower punch 80 moves upwardly to the upper surface of the die 60. As a result, the green compact 10P is ejected from the die 60. In the produced green compact 10P, a tooth portion 20P which is compressed at a high ratio is formed with a high density, and a body portion 30P which is compressed at a low ratio is formed with a low density. The green compact 10P is sintered, and a sintered material of the gear member 10, which is a sintered compact having the above density ratios maintained, is thereby obtained.

On the other hand, the bearing member 50 has a porosity which will become a porosity of 5 to 30% after the compression. The bearing member 50 has pores with maximal pore diameter of 5 to 100 μm, and amount of the pores is 5 to 50% of whole pore amount of the bearing member 50. Although the bearing member 50 before the compacting has a near net shape, it has an outer diameter which allows the bearing member 50 to be fitted into the fitting hole 31 of the gear member 10 in a clearance fit condition. That is, the outer diameter of the bearing member 50 is slightly larger than the inner diameter of the fitting hole 31. For example, the fitting size difference therebetween exceeds 0 and is 300 μm or less.

Figure 3A:
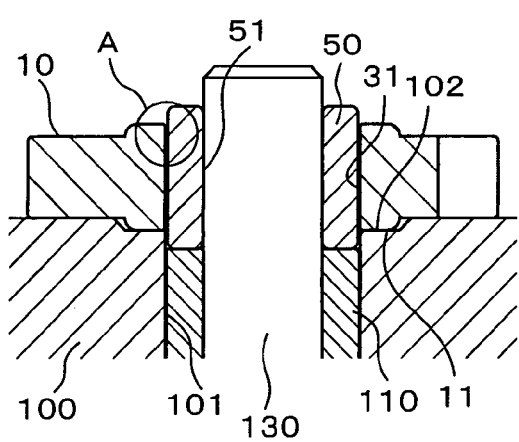
FIGS. 3A and 3B are cross sectional views which show a production method of the first embodiment.
Figure 3B:
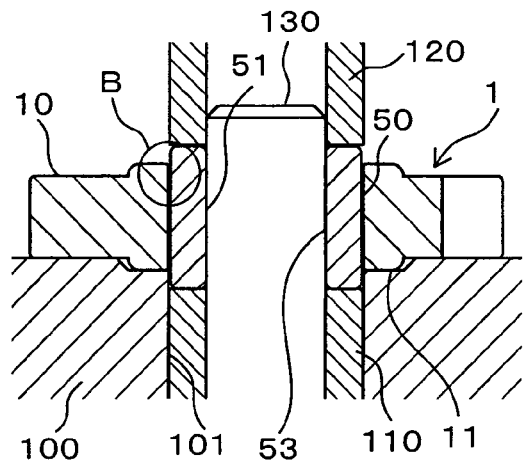

In production of the gear 1 by using the gear member 10 and the bearing member 50, for example, a die apparatus shown in FIGS. 3A and 3B is used. The die apparatus is equipped with a die 100, cylindrical lower and upper punches 110 and 120, and a core rod 130. The die 100 has a cylindrical die hole 101. The lower punch 110 is slidably inserted into the die hole 101 from the lower side. The upper punch 120 is coaxially disposed above the lower punch 110 and has the same shape and size as the lower punch 110. The core rod 130 is slidably inserted into the upper and lower punches 120 and 110. An annular recess 102, into which the step portion 11 of the gear member 10 extending between the tooth portion 20 and the body portion 30 is fitted, is formed around the die hole 101 on a flat upper surface of the die 100. The punches 120 and 110 have outer diameters and inner diameters which are nearly equal to those of the bearing member 50.

In order to produce the gear 1 by using the die apparatus, first, as shown in FIG. 3A, an upper end of the lower punch 110 is positioned slightly lower than the recess 102, and the core rod 130 projects from the upper surface of the die 100. The projection amount of the core rod 130 is sufficiently longer than the axial direction length of the bearing member 50 of the gear 1. Next, the fitting hole 31 of the gear member 10 passes through the core rod 130, and the step portion 11 is fitted into the recess 102. The gear member 10 is mounted onto the die 60. The body portion 30 is fitted into the recess 102, so that the gear member 10 is set to be nearly coaxial with the die hole 101.

Figure 4A:
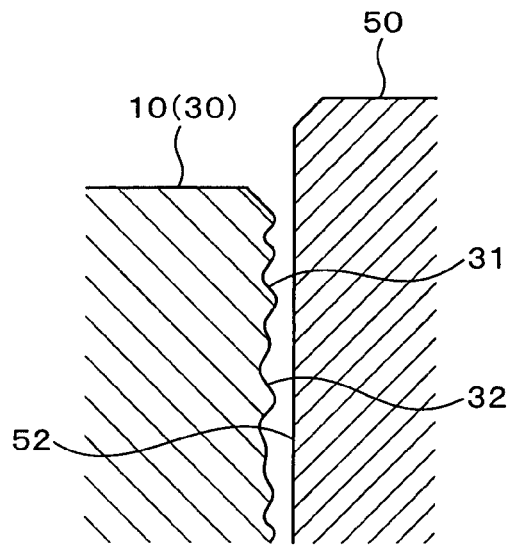
FIGS. 4A and 4B are enlarged diagrams which show the A portion in FIG. 3A and the B portion in FIG. 3B.

Next, the core rod 130 penetrates 130 the shaft hole 51 of the bearing member 50, the bearing member 50 moves downwardly, and a lower end of the bearing member 50 abuts onto the lower punch 110. The bearing member 50 is fitted into the fitting hole 31 in a clearance fit condition since the outer diameter of the bearing member 50 is slightly smaller than the inner diameter of the fitting hole 31. That is, as shown in FIG. 4A, the bearing member 50, which is fitted into the fitting hole 31 while being guided by the core rod 130, is fitted into the fitting hole 31 without contacting of an outer circumferential surface 52 to the inner circumferential surface 32 of the fitting hole 31.

Figure 4B:
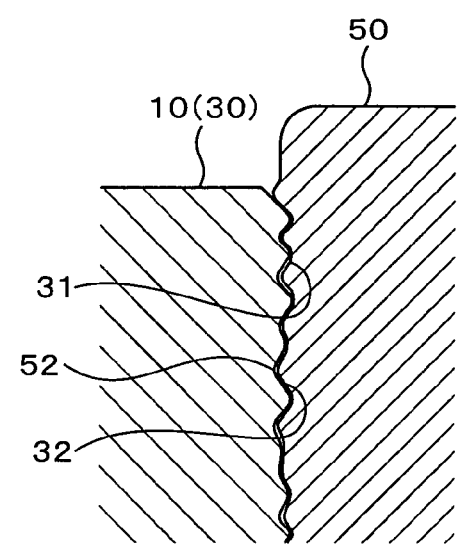

As shown in FIG. 3B, while the lower punch 110 is supported, the upper punch 120 moves downwardly and abuts onto the lower punch 110. The upper punch 120 further moves downwardly, so that the bearing member 50 is pressed by the upper and lower punches 120 and 110 in the axial direction, thereby being compressed. FIG. 4B shows a compressed condition of the bearing member 50. In the compressed bearing member 50, plastic deformation occurs such that the material of the bearing member 50 flows toward the outer circumferential side, the outer circumferential surface 52 of the bearing member 50 is pressed onto the inner circumferential surface 32 of the fitting hole 31 of the gear member 10, and the outer circumferential surface 52 of the bearing member 50 flows into convexoconcaves of the inner circumferential surface 32, convexoconcave fitting of the gear member 10 and the bearing member 50 is performed. Thus, the outer circumferential surface 52 of the bearing member 50 tightly contacts the inner circumferential surface 32 of the fitting hole 31 of the gear member 10 without a clearance formed therebetween, and contact area thereof increases, so that the bearing member 50 integrally fixes into the gear member 10 with high strength. An inner circumferential surface 53 of the shaft hole 51 of the bearing member 50 strongly abuts to the core rod 130, and the size of the shaft hole 51 is adjusted in accordance with the outer diameter of the core rod 130. After the compression of the bearing member 50 and the fixation of the bearing member 50 to the gear member 10 are completed, the upper punch 120 moves upwardly therefrom, so that the gear 1, which has the gear member 10 and the bearing member 50 fixed thereto, is obtained.

Figure 14A:
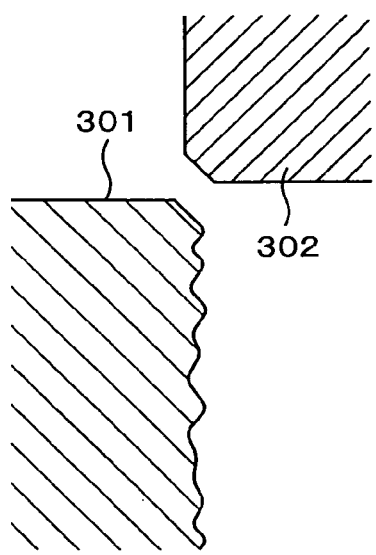
FIGS. 14A and 14B are enlarged diagrams which show the A portion in FIG. 13A and of the B portion in FIG. 13B.
Figure 14B:
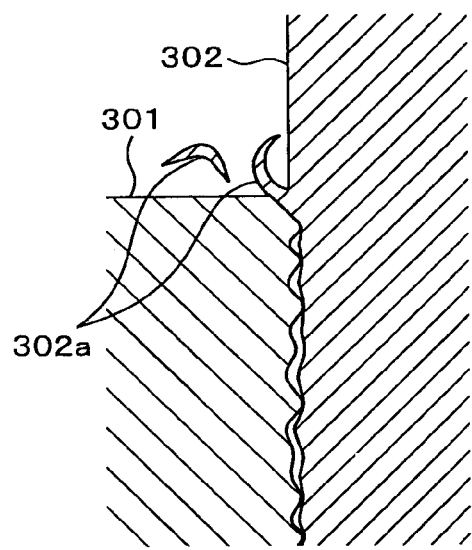
Figure 15A:
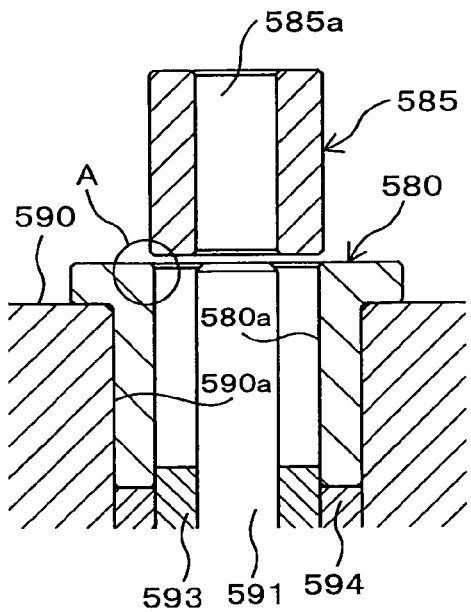
FIGS. 15A and 15B are cross sectional views which show a production method for a conventional bearing unit into which a sintered bearing is fitted.
Figure 15B:
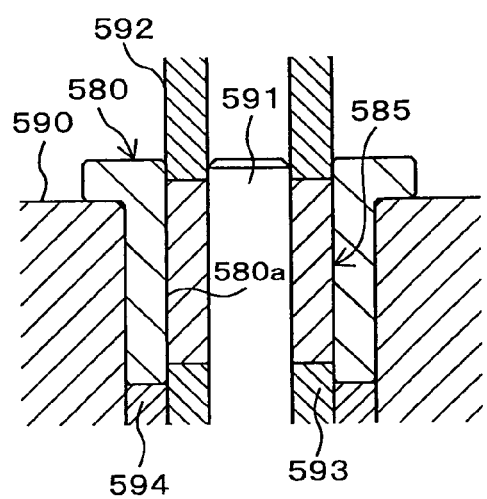
Figure 16A:
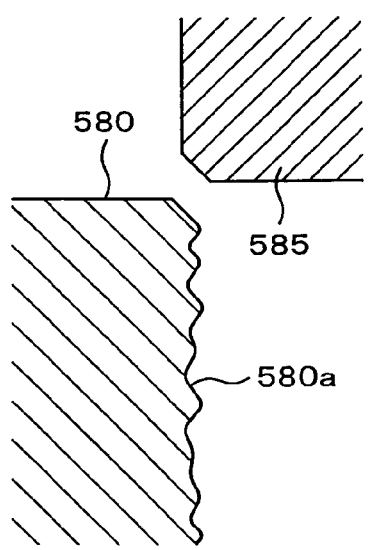
FIG. 16A is an enlarged diagram which shows the A portion in FIG. 15A and FIG. 16B an enlarged diagram which shows a sintered bearing is press-fitted into a housing.
Figure 16B:
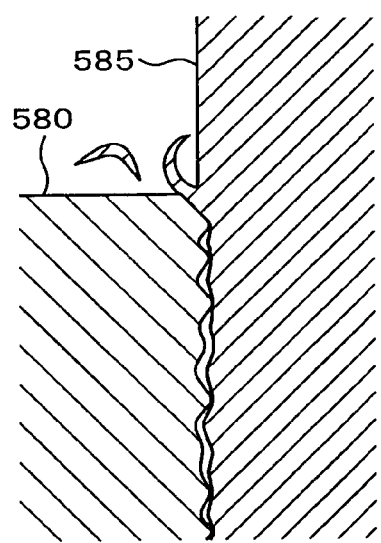

In the gear 1, the convexoconcave fitting of the outer circumferential surface 52 of the bearing member 50, which is relatively softer than the gear member 10, into the inner circumferential surface 32 of the fitting hole 31 of the gear member 10 is performed, so that high fixing strength therebetween is obtained. Thus, slip between the gear member 10 and the bearing member 50 can be prevented in practical use of them as a complex bearing (for example, planetary gear), and stable transmission of force can be obtained for a long time period. The bearing member 50 is not press-fitted into the gear member 10, but the bearing member 50 fitted thereinto in a clearance fit condition is compressed, and plastic deformation in the bearing member 50 occurs toward the outer circumferential surface of the bearing member 50, so that the convexoconcave fitting can be reliably performed. Since the fixation by the press-fitting is not performed, the cut of the outer circumferential surface 52 shown in FIG. 14B can be prevented, so that burr removal process is unnecessary, and resistance generated between the gear member 10 and the bearing member 50 in pressure application is small in comparison with the press-fitting. Therefore, since a load required in pressure application can be reduced and a load to pressure application apparatus can be reduced, the productivity can be improved.

(2) Second Embodiment

Figure 5:
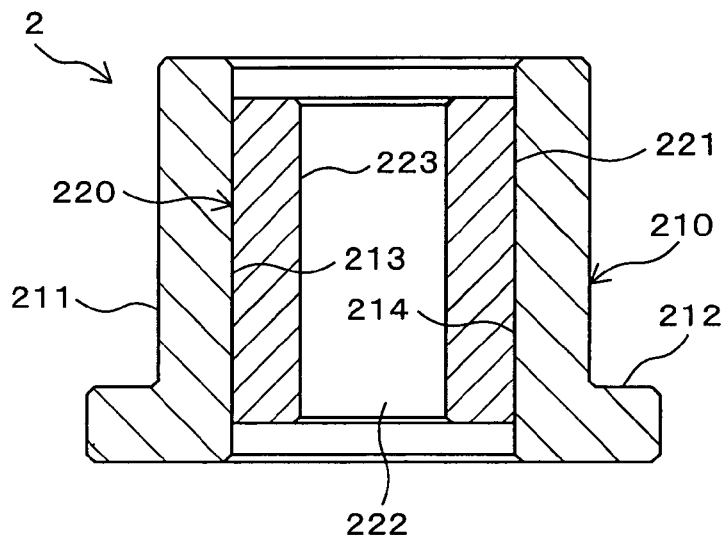
FIG. 5 is a cross sectional view which shows a bearing unit produced by a production method of the second embodiment according to the present invention.

FIG. 5 shows a bearing unit (complex bearing) 2 produced by a production method of the second embodiment according to the present invention. The bearing unit 2 is equipped with a housing (outer member) 210 and a sintered bearing member (hereinafter referred to as "bearing member") 220 integrally fixing into the housing 210. The housing 210 is a cylindrical member having a body portion 211, a flange portion 212 and a fitting hole 213. The flange portion 212 is formed at an end portion of the body portion 211. The fitting hole 213 has a constant inner diameter and the bearing member 220 is fitted thereinto. The housing 210 is obtained by cutting an ingot material of brass. The bearing member 220 is a compact of a Cu-based or Fe—Cu based sintered material having a sliding property and deformability, and it is a simply cylindrical sintered compact having constant outer and inner diameters and an axial direction length which is nearly shorter than that of the housing 210. The bearing member 220 is coaxially fitted into the fitting hole 213 of the housing 210, and an outer peripheral surface 221 of the bearing member 220 tightly contacts an inner peripheral surface 214 of the fitting hole 213. A rotational shaft (not shown in the drawings) is slidably inserted into an shaft hole 222 of the bearing member 220. The following method is used for producing the above structured bearing unit 2.

First, the housing 210 and the bearing member 220 satisfying conditions of the present invention are prepared. In this case, in the housing 210 composed of an ingot material of brass as described above, surface roughness of the inner peripheral surface 214 of the fitting hole 213 is set to be 3.2 to 100 μm at maximal height by controlling a machining condition of cutting. On the other hand, a raw powder composed of a Cu-based or Fe—Cu based sintered material is compacted into a green compact, and the green compact is sintered, so that the bearing member 220 is obtained. The bearing member 220 has a porosity of 5 to 30%, and has an outer diameter allowing clearance fit of the bearing member 220 into the housing 210. That is, the outer diameter of the bearing member 220 is slightly smaller than the inner diameter of the fitting hole 213 of the housing 210. For example, the fitting size difference therebetween exceeds 0 and is 300 μm or less.

Figure 6A:
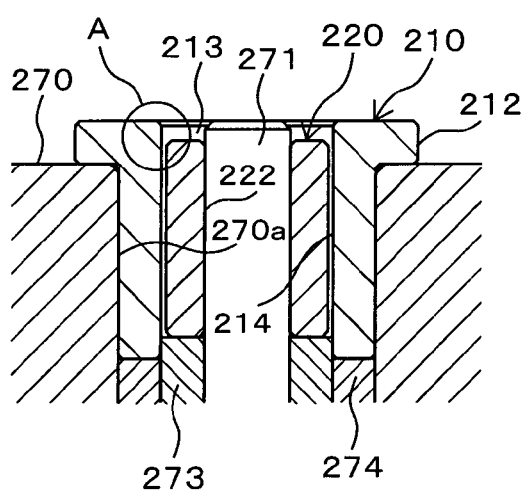
FIGS. 6A and 6B are cross sectional views which show a production method of the second embodiment.
Figure 6B:
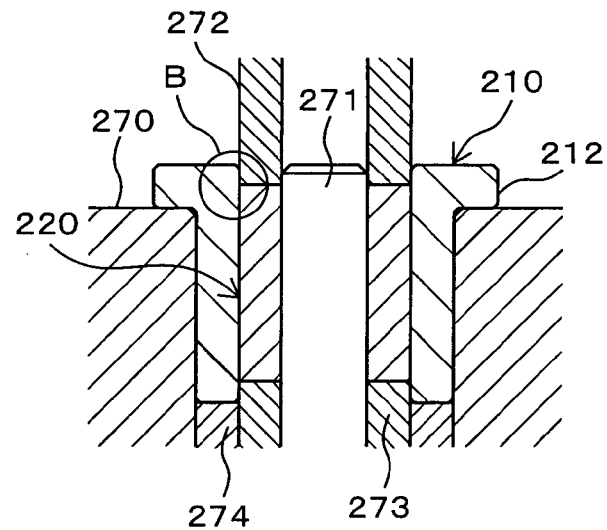

The bearing unit 2 is produced such that the housing 210 and the bearing member 220 are set on a die apparatus shown in FIGS. 6A and 6B and the bearing member 220 is compressed in the axial direction. The die apparatus is equipped with a die 270, a core rod 271, cylindrical compression punches 272 and 273, and a supporting punch 274. The die 270 has a cylindrical die hole 270a into which the housing 210 is fitted. The core rod 271 is disposed at a center of the die hole 270a. The compression punches 272 and 273 are disposed at upper and lower positions, are slidably inserted into the housing 210, and they compress the bearing member 220. The supporting punch 274 supports the housing 210.

In order to produce the bearing unit 2, first, as shown in FIG. 6A, the supporting punch 274 is disposed at a position allowing the upper end of the supporting punch 274 to abut to the lower surface of the housing 210. The lower punch 273 is disposed at a position allowing the upper end portion of the lower punch 273 to be inserted into the fitting hole 213 of the housing 210 at a predetermined length. The position of the core rod 271 is adjusted so as to allow the upper end surface of the core rod 271 to be higher than the height of the bearing member 220 after the compression. Next, the body portion 211 of the housing 210 is inserted into the die hole 270a from the upside, the core rod 271 is disposed at the center of the fitting hole 213. The flange portion 212 of the housing 210 is mounted onto the flat upper surface of the die 270, and the lower end surface of the housing 210 is mounted onto the supporting punch 274. The housing 210 is supported by the upper surface of the die 270 and the supporting punch 274, and it is disposed so as to be nearly coaxial with the die hole 270a.

Next, as shown in FIG. 6A, the core rod 271 slides on the shaft hole 222 and penetrates the shaft hole 222, and the bearing member 220 is fitted into the fitting hole 213 of the housing 210. The bearing member 220 moves downwardly, the lower surface of the bearing member 220 abuts to the lower punch 273, and the bearing member 220 is provided into the fitting hole 213 of the housing 210. Since the outer diameter of the bearing member 220 is slightly smaller than the inner diameter of the fitting hole 213, the outer circumferential surface 221 of the bearing member 220 is guided by the core rod 271, and it is fitted into the fitting hole 213 in a clearance fit condition without contacting thereof to the inner circumferential surface 214 of the fitting hole 213 of the housing 210.

Figure 7A:
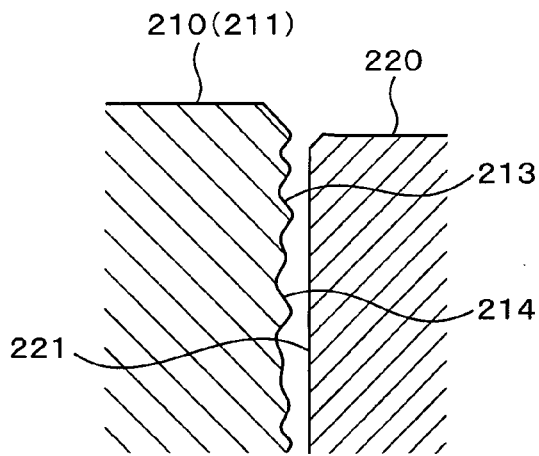
FIGS. 7A and 7B are enlarged diagrams which show the A portion in FIG. 6A and the B portion (which is other than the upper punch) in FIG. 6B.
Figure 7B:
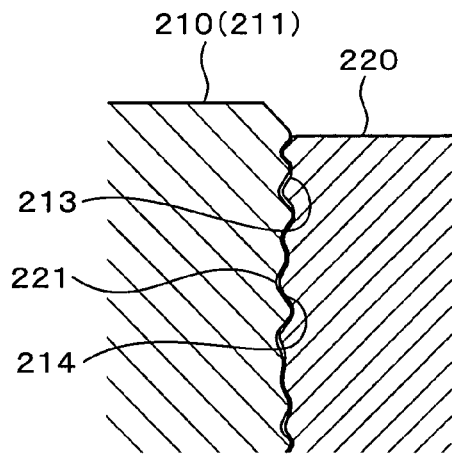

As shown in FIG. 6B, the upper punch 272 moves downwardly, and it abuts onto the upper surface of the bearing member 220. The upper punch 272 further moves downwardly, the position of the lower punch 273 is maintained, and the bearing member 220 is pressed in the axial direction, thereby being compressed. In the compressed bearing member 220, as shown in FIGS. 7A and 7B, plastic deformation occurs such that the material of the bearing member 220 flows toward the outer circumferential side thereof, the outer circumferential surface 221 of the bearing member 220 is pressed onto the inner circumferential surface 214 of the housing 210 which has the above surface roughness. The outer circumferential surface 221 of the bearing member 220 flows into convexoconcaves of the inner circumferential surface 214, convexoconcave fitting of the housing 210 and the bearing member 220 is performed. Thus, the outer circumferential surface 221 of the bearing member 220 tightly contacts the inner circumferential surface 214 of the housing 210 without a clearance formed therebetween, and contact area thereof increases, so that the bearing member 220 integrally fixes into the housing 210 with high strength. The inner circumferential surface 223 of the shaft hole 222 of the bearing member 220 strongly abuts onto the core rod 271, and the inner diameter of the shaft hole 222 is adjusted in accordance with the outer diameter of the core rod 271. After the compression of the bearing member 220 and the fixation of the bearing member 220 to the housing 210 are completed, the upper punch 272 moves upwardly therefrom, and the supporting punch 274 moves upwardly, so that the bearing unit 2, which has the gear member 10 and the bearing member 50 fixing thereto, is ejected from the die hole 270a.

In the bearing unit 2 obtained in the above manner, the convexoconcave fitting of the outer circumferential surface 221 of the bearing member 220, which is relatively soft, into the inner circumferential surface 214 of the fitting hole 213 of the housing 210 is performed, and high fixing strength therebetween is obtained. Thus, slip between the housing 210 and the bearing member 220 can be prevented in practical use (that is, in rotating of a rotation shaft inserted into the shaft hole 222 of the bearing member 220), and projection or fall of the bearing member 220 from the housing 210 can be prevented. The bearing member 220 is not press-fitted into the housing 210, but the bearing member 220 fitted thereinto in a clearance fit condition is compressed, and plastic deformation in the bearing member 220 occurs toward the outer circumferential surface of the bearing member 220, so that the convexoconcave fitting can be reliably performed. Since the fixation by the press-fitting is not performed, the cut of the outer circumferential surface 221 of the bearing member 220 can be prevented shown in FIG. 7B, so that burrs are not generated, and resistance which is generated in pressure application between the housing 210 and the bearing member 220 is small in comparison with the press-fitting. Therefore, since a load required in pressure application can be reduced and a load to a pressure application apparatus can be reduced, the productivity can be improved.

In the above method shown in FIGS. 6A and 6B, the body portion 211 of the housing 210 is inserted into the die hole 270a. When the housing 210 is relatively thick or has a high stiffness and plastic deformation is thereby inhibited, instead of inserting the body portion 211 into the die hole 270a, the bearing member 220 is mounted onto the upper surface of the die 270 which has a positioning device provided thereon such that the flange portion 212 faces downward, and the bearing member 220 is compressed and fixes to the housing 210.

(3) Third Embodiment

Figure 8A:
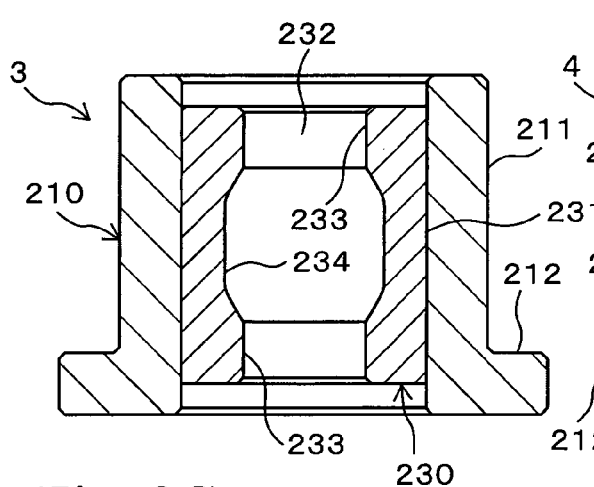
FIGS. 8A to 8C are cross sectional views which show bearing units produced by a production method of the third embodiment according to the present invention.
Figure 8B:
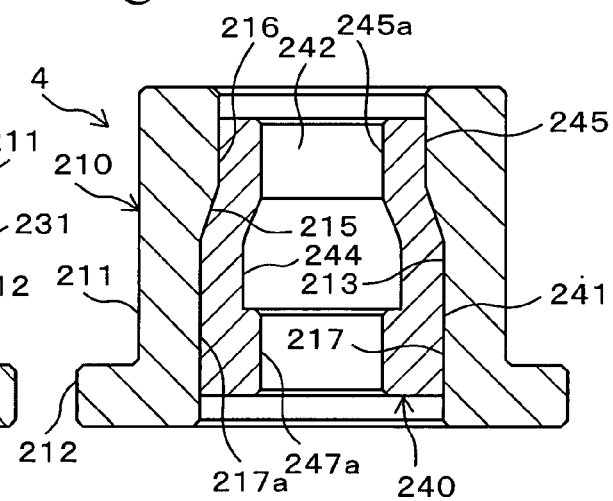
Figure 8C:
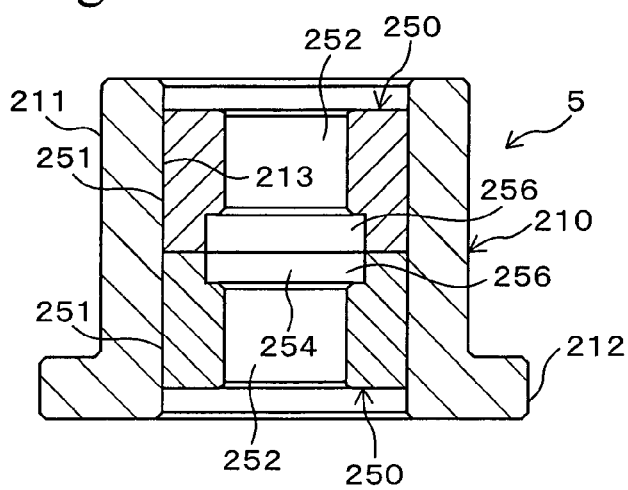

FIGS. 8A to 8C show bearing units 3 to 5 of the third embodiment according to the present invention, each unit 3 to 5 being equipped with a sintered bearing which fixes to a housing and is integrated therewith. Each sintered bearing has an inner relief portion which is formed at an inner circumferential surface thereof and which is not contacted by a rotational shaft inserted into a shaft hole. The inner relief portion is an advantageous technique for improving each bearing unit 3 to 5 in lubricating ability by increasing stored amount of lubricating oil.

As shown in FIG. 8A, the bearing unit 3 is equipped with a sintered bearing 230. The sintered bearing 230 has an inner relief portion 234 which is formed at an axial direction center portion of shaft hole 232 and has a diameter larger than axial direction opposite end portions of the sintered bearing 230. As shown in FIG. 8B, the bearing unit 4 is equipped with a sintered bearing 240 having an inner relief portion 244. The inner relief portion 244, which is almost the same as that shown in FIG. 8A, has a nonconstant outer diameter. The outer diameter of one end portion (upper end portion in FIG. 8B) is smaller than that of other portion which is formed as a small diameter portion 245. Therefore, the fitting hole 213 of the housing 210 is shaped corresponding to an outer circumferential surface of the sintered bearing 240.

As shown in FIG. 8C, the bearing unit 5 has two sintered bearings 250. The sintered bearings 250 tightly fixes to each other in the fitting hole 213 of the housing 210. An inner relief portion 254 is formed at an axial direction center portion of combination body of the sintered bearings 250. The bearing units 3 to 5 can be produced by the production method of the present invention. The method examples will be explained hereinafter. In the method examples, since a die apparatus having the same structure as that shown in FIGS. 6A and 6B is used, the explanation of the die apparatus will be omitted.

Figure 9A:
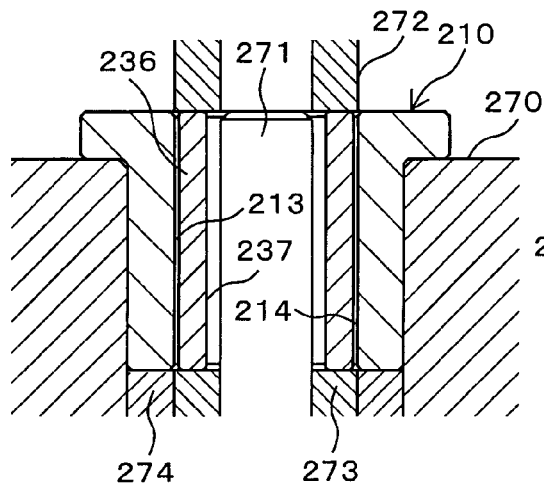
FIGS. 9A and 9B are cross sectional views which show a production method for the bearing unit in FIG. 8A.
Figure 9B:
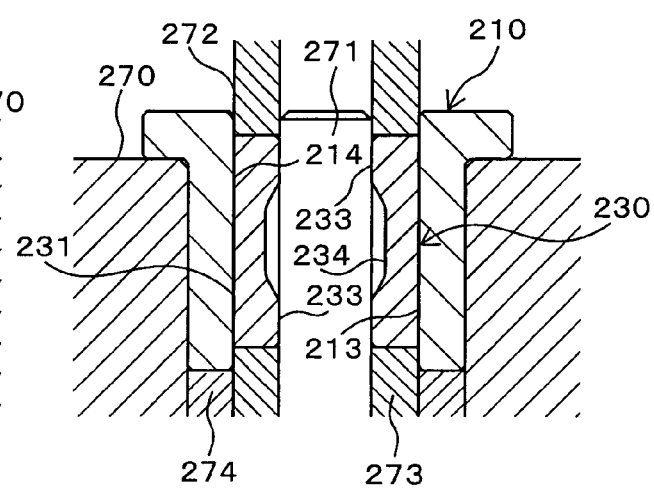

FIGS. 9A and 9B show a production method of the bearing unit 3 shown in FIG. 8A. The housing 210 has the same structure as that shown in FIGS. 6A and 6B, and the inner circumferential surface 214 of the fitting hole 213 also has a surface roughness of 3.2 to 100 µm at a maximal height. FIG. 9A shows a condition in which a sintered bearing 236 before compression is provided in a fitting hole 213 of the housing 210 set in the die 270. Regarding the sintered bearing 236, since a sintered bearing after compression greatly deforms, the sintered bearing of this case is referred to as a "bearing material 236" hereinafter. The bearing material 236 has a simply cylindrical shape having constant inner and outer diameters in the same manner as the sintered member 220 before compression shown in FIGS. 6A and 6B. The bearing material 236 has an outer diameter allowing clearance fit of the bearing material 236 into the fitting hole 213 such that the fitting difference between the bearing material 236 and the fitting hole 213 of the housing 210 exceeds 0 and is 300 µm or less. In this case, the bearing material 236 has an inner diameter larger than an outer diameter of the core rod 271 such that a clearance of 10 to 500 µm is formed between the inner circumferential surface 237 and the core rod 271, although the bearing member 220 before compression shown in FIGS. 6A and 6B has an inner diameter allowing sliding of an inner circumferential surface 223 to a core rod 271.

From the set condition shown in FIG. 9A, the bearing material 236 is compressed in the axial direction by the upper and lower punches 272 and 273. As shown in FIG. 9B, the outer circumferential surface of the bearing material 236 expands toward an outer circumferential direction, and it tightly contacts the inner circumferential surface 214 of the housing 210. The inner circumferential surfaces of axial direction opposite portions of the bearing material 236 expand toward inner circumferential direction, and tightly contact the core rod 271. Thus, the above structured sintered bearing 230 is obtained. In this sintered bearing 230, the outer circumferential surface 231 fixes to the inner circumferential surface 214 of the housing 210 by the action shown in FIG. 7B, and the circumferential surfaces of the axial direction opposite end portions which are tightly contacted by the core rod 271 are used as shaft supporting surfaces 233. A clearance between the core rod 271 and the sintered bearing 230 exists between the axis supporting surfaces 233, so that the inner relief portion 234 is formed.

Figure 10A:
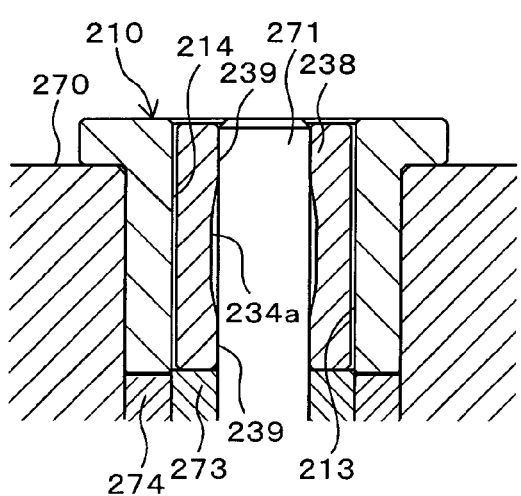
FIGS. 10A and 10B are cross sectional views which show another production method for the bearing unit in FIG. 8A.
Figure 10B:
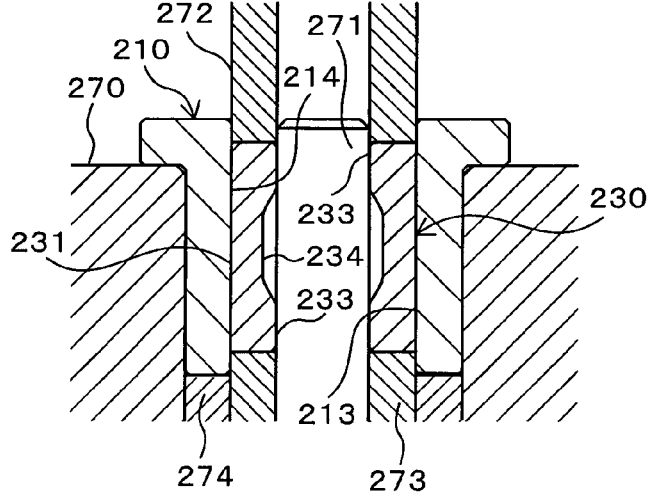

FIGS. 10A and 10B show another production method for producing the bearing unit 3 which is shown in FIG. 8A and uses different form of bearing material. In this case, the bearing material 238 shown in FIG. 10A has a preliminary inner relief portion 234a which is formed at an axial direction center portion thereof beforehand. The preliminary inner relief portion 234a has an inner diameter smaller than that of the inner relief portion 234 after compression, and the inner circumferential surface of the preliminary inner relief portion 234a does not contact the core rod 271. Small inner diameter portions 239 are formed beforehand at axial direction opposite portions which are opposite sides of the preliminary inner relief portion 234a. The core rod 271 may be slidable on the inner circumferential surfaces of the small inner diameter portions 239, or the small inner diameter portions 239 may have inner diameters which are slightly larger than the outer diameter of the core rod 271. In the same manner as the bearing material 236 shown in FIG. 9A, the bearing material 238 has an outer diameter allowing clearance fit of the bearing material 238 into the fitting hole 213 of the housing 210 such that the fitting difference between the bearing material 238 and the fitting hole 213 of the housing 210 exceeds 0 and is 300 µm or less.

As shown in FIG. 10A, the sintered material 236 is provided into the fitting hole 213 of the housing 230 set in the die 270, and the bearing material 236 is compressed in the axial direction by the upper and lower punches 272 and 273. Thus, as shown in FIG. 10B, the outer circumferential surface of the bearing material 236 expands toward an outer circumferential direction, and it tightly contacts the inner circumferential surface 214 of the housing 210. The inner circumferential surfaces of the small inner diameter portions 239 at axial direction opposite portions of the bearing material 236 expand toward inner circumferential direction, tightly contact the core rod 271, and is used as the axis supporting surface 233. Thus, the above structured sintered bearing 230 is obtained. In this sintered bearing 230, the preliminary inner relief portion 234a expands toward the outer circumferential direction, and the inner diameter thereof increases, so that the inner relief portion 234 is formed. By this action, inner relief amount of the bearing member 220 (that is, clearance between inner diameter of the inner relief portion 234 (inner circumferential surface of the inner relief portion 234) and rotational shaft) can be large. When the inner relief amount is large, a large amount of stored lubricating oil to the inner relief portion 234 is secured, and a lubricating property can be improved. The preliminary inner relief portion 234a of the bearing material 236 can be formed by a typical method disclosed in Japanese Unexamined Patent Application Publication No. H7-332363, Japanese Unexamined Patent Application Publication No. H10-046212, and Japanese Unexamined Patent Application Publication No. 2001-032838.

Figure 11A:
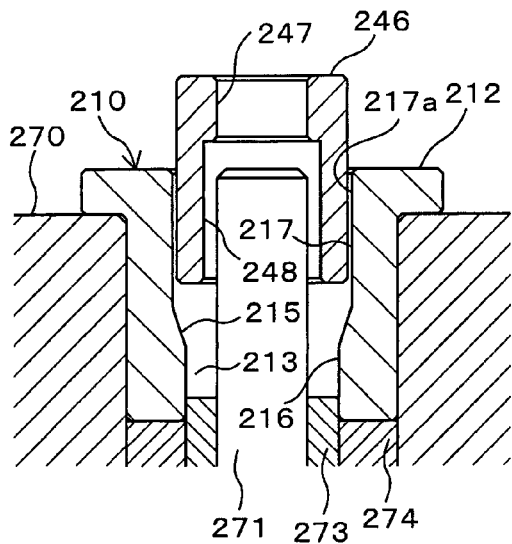
FIGS. 11A and 11B are cross sectional views which show a production method for the bearing unit in FIG. 8B.
Figure 11B:
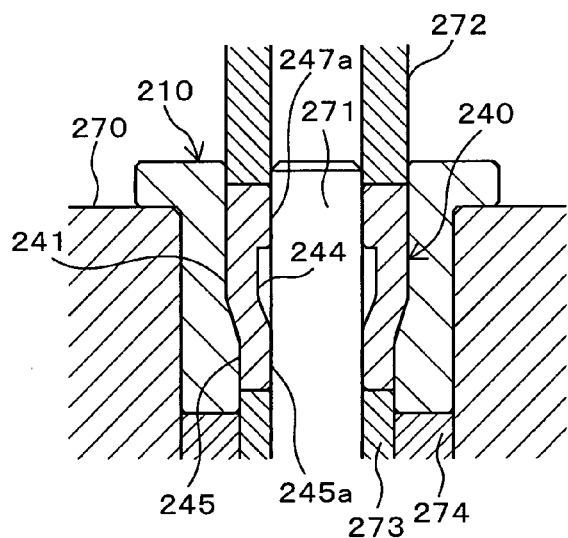

FIGS. 11A and 11B show one example of production method of the bearing unit 4 shown in FIG. 8B. In this case, the inner diameter of the fitting hole 213 of the housing 210 is nonconstant. At an end portion opposite to the flange portion 212 in the fitting hole 213, a small inner diameter portion 216 is formed via a tapered pressing portion 215. At a side opposite to the small inner diameter portion 216 in the fitting hole 213, a large inner diameter portion 217 is formed via the pressing portion 215. As shown in FIG. 11A, the housing 210 is set in the die 270 such that the side of the housing 210 proximate to the small inner diameter portion 216 faces downward and the lower punch 273 slides and is inserted into the small inner diameter portion 216. In the housing 210, only inner circumferential surface 217a of the large inner diameter portion 217 of the fitting hole 213 has a surface roughness of 3.2 to 100 µm at a maximal height.

On the other hand, in this case, the bearing material 246 shown in FIG. 11A has a small inner diameter portion 247 at an axial direction end portion (upper portion shown in FIG. 11A). The inner diameter of the small inner diameter portion 247 is smaller than that of other portion of the bearing material 246. The bearing material 246 is fitted into the large inner diameter portion 217 of the fitting hole 213 of the housing 210 in a clearance fit condition such that the side of the bearing material 246 proximate to the small inner diameter portion 247 faces upward. In this case, the fitting difference therebetween exceeds 0 and is 300 µm or less. The outer diameter of the bearing material 246 is larger than the inner diameter of the small inner diameter portion 216 of the housing 210. The inner diameter of the small inner diameter portion 247 is set such that the core rod 271 is slidable to the inner circumferential surface thereof, or the inner diameter of the small inner diameter portion 247 is slightly larger than the outer diameter of the core rod 271. The inner diameter of the large inner diameter portion 248 of the bearing material 246 which is other than the small inner diameter portion 247 is nearly intermediate between the outer diameter of the core rod 271 and the inner diameter of the small inner diameter portion 216 of the housing 210.

As shown in FIG. 11A, the bearing material 246 is fitted into the housing 210. As shown in FIG. 11B, the bearing material 246 shown in FIG. 11A is pressed into the housing 210 by the upper punch 272, and it is compressed in the axial direction by the upper and lower punches 272 and 273. Thus, the outer circumferential surface of the bearing material 246 expands toward an outer circumferential direction, and it tightly contacts the inner circumferential surface 214 of the housing 210. Thus, the above structured sintered bearing 240 is obtained. In particular, a portion of the outer circumferential surface 241 of the sintered bearing 240, which tightly contacts the inner circumferential 217a of the large inner diameter portion 217 in the housing 210, fixes thereto by the action shown in FIG. 7B, the portion having a surface roughness of 3.2 to 100 µm at a maximal height. In the sintered bearing 240, an end portion of the bearing material 246 proximate to the large inner diameter portion 248 is pressed by the pressing portion 215, so that the outer diameter and the inner diameter of the end portion thereof are reduced, and the small diameter portion 245 is formed. The inner circumferential surface of the small diameter portion 245 abuts to the outer circumferential surface of the core rod 271, so that an axis supporting surface 245a is formed. The inner circumferential surface of the small diameter portion 247 of the bearing material 246 abuts to the outer circumferential surface of the core rod 271, so that an axis supporting surface 247a is formed. The clearance between the sintered bearing 240 and the core rod 271 remains the between the axis supporting surfaces 245a and 247a, so that the inner relief portion 244 is formed.

As described above, FIGS. 9A to 11B show each production method example in which the sintered bearing is obtained by compressing the bearing material in the housing, the sintered bearing fixes and is integrated into the housing, and the inner relief portion is formed in the sintered bearing. Since the sintered bearing can fix to the housing in the present invention, as shown in FIG. 8C, the inner relief portion can be easily formed by using the two sintered bearings 250.

Figure 12A:
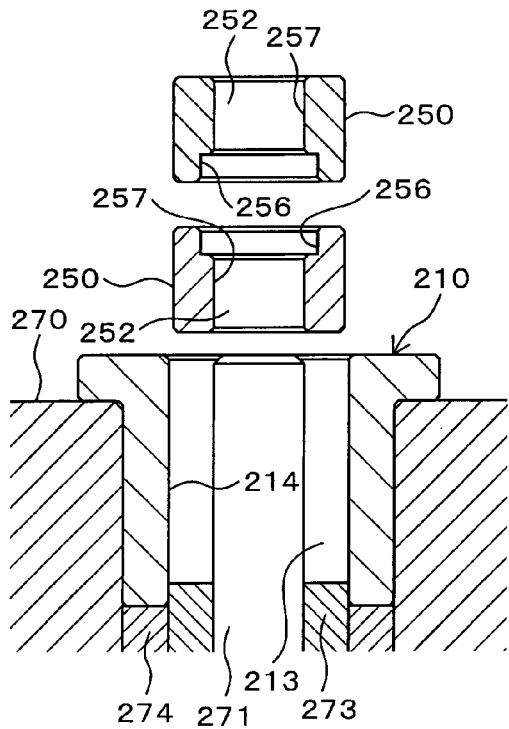
FIGS. 12A and 12B are cross sectional views which show a production method for the bearing unit in FIG. 8C.
Figure 12B:
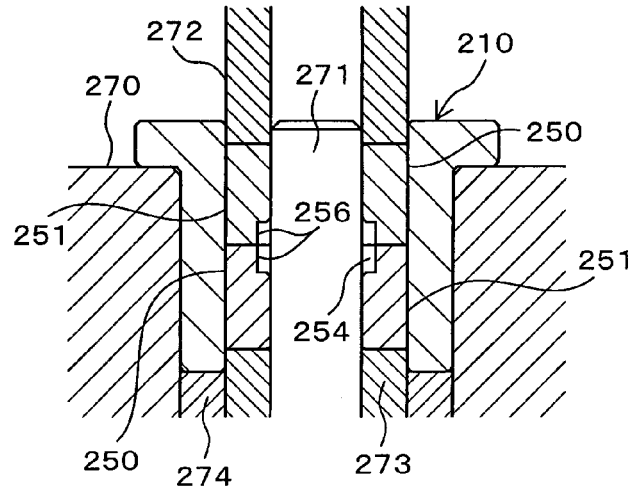
Figure 13A:
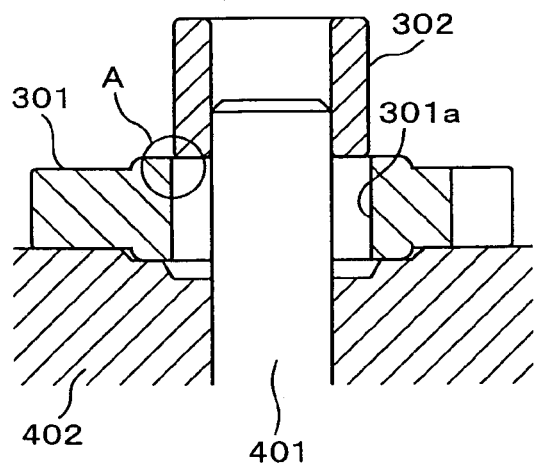
FIGS. 13A and 13B are cross sectional views which show a conventional production method.
Figure 13B:
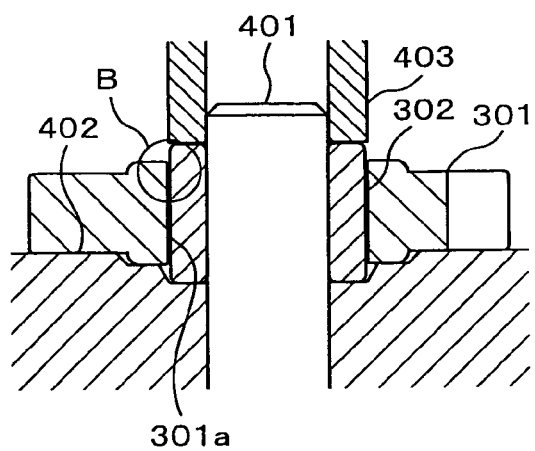

FIGS. 12A and 12B show one production method example thereof. The two sintered bearings 250 shown in FIG. 12A have the same structures. The outer diameters of the sintered bearings 250 allow fitting of sintered bearings 250 into the fitting hole 213 of the housing 210 in a clearance fit condition. In this case, the fitting size difference exceeds 0 and is 300 µm or less. The axial direction length of each sintered bearing 250 is nearly half of those of the above bearing materials 236 or 246 or the like. The large inner diameter portion 256 is formed at the axial direction end portion of the bearing 252. The inner diameter of the small inner diameter portion 257 of the bearing 252 which is other than large inner diameter portion 256 is set such that the core rod 271 slides on the inner circumferential surface thereof or the inner diameter of the small inner diameter portion 257 is slightly larger than the outer diameter of the core rod 271. In the housing 210 which is the same manner as that shown in FIGS. 6A and 6B, the inner circumferential surface 214 of the fitting hole 213 has a surface roughness of 3.2 to 100 µm at a maximal height.

The end surfaces of the two sintered bearings 250 abut to each other and the two sintered bearings 250 are fitted into the fitting hole 213 of the housing 210. As shown in FIG. 12B, the two sintered bearings 250 are compressed by the upper and lower punches 272 and 273 in the axial direction, so that plastic deformation of the outer circumferential surface 251 occurs toward the outer circumferential direction, and the outer circumferential surface 251 tightly contacts the inner circumferential surface 214 of the fitting hole 213 of the housing 210. Each sintered bearing 250 fixes and is integrated to the inner circumferential surface 214 of the fitting hole 213 of the housing 210 by the action shown in FIG. 7B. The end surfaces abutting to each other tightly contact, the large inner diameters 256 of them contact each other, and one inner relief portion 254 is formed. Thus, as shown in FIG. 8C, the bearing unit 5 is obtained. In this production method example, the inner relief portion 254 can be easily produced in comparison with the above embodiments (shown in FIG. 9A to 11B) in which the inner relief portion is formed by deformation of the bearing material.

In the production method example shown in FIGS. 12A and 12B, the number of the sintered bearings 250 is not limited to two, and it can be 3 or more. Although the end surfaces of the two sintered bearings 250 abut to each other as described above, instead of this, for example, in the complex bearing disclosed in Japanese Unexamined Patent Application Publications Nos. H9-151941 and 2004-251302, the complex bearing which is integrally formed beforehand is used as a bearing material.

Although the housing is composed of ingot material as described above, instead of this, the housing of the present invention may be composed of Cu-based or Fe—Cu-based sintered material, and it may be formed by using by Fe-based sintered material having a strength higher than the sintered bearing. In this case, in order that the inner circumferential surface of the fitting hole of the housing have a surface roughness of 3.2 to 100 at a maximal height, the housing can be in a condition obtained by the sintering without cutting thereto.

EXAMPLES

Next, examples of the present invention will be explained, and the effects of the present invention were confirmed as follows.

Example 1

Each gear member of the example 1 was produced as follows. 1.5 mass % of electrolytic copper powder and 1.0 mass % of graphite powder, which had different particle diameter distributions, were added to an atomized Fe powder having a different particle diameter distribution. A zinc stearate was added to the mixed powder as compacting lubricant in the ratio of 0.8 weight part to 100 weight parts, so that a raw powder was obtained. The raw powder was compacted and sintered, so that a gear member was obtained. As shown in Table 1, 9 kinds of gear members (Sample Nos. 01 to 09), which had fitting holes having different concavoconvex degrees, that is, different maximal heights (μm), were respectively produced by 10 pieces. The all inner diameters of the fitting holes were 5 mm. Among gear members, in some of the gear members, each inner circumferential surface of the fitting hole was subjected to machining, so that the concavoconvex degrees were varied so as to be larger or smaller. Another of the gear members were in a condition obtained by the sintering.

Each bearing member of the example 1 was produced as follows. 5 mass % of Sn powder was added to a electrolytic copper powder, so that a mixed powder was obtained. A zinc stearate was added to the mixed powder as compacting lubricant in the ratio of 0.8 weight part to 100 weight parts, so that a raw powder was obtained. The raw powder was compacted and sintered, so that a bearing member was obtained. The required number of bearing members having an outer diameter of 4.96 mm, an inner diameter of 3 mm, and a porosity of 25% were obtained.

Each bearing complex gear of the example 1 was produced as follows. As shown in FIG. 3A, each gear member and each bearing member produced in the above manner were set in a die apparatus. In this case, according to the above sizes thereof, it is obvious that fitting clearance between the gear member and the bearing member was 20 μm. Next, a pressure of 40 MPa was applied to the bearing member by the upper and lower punches in the axial direction, and the bearing member fixed to the gear member. As a result, bearing complex gears (samples 01 to 09) were produced as shown in FIG. 1.

A fixing test of the bearing member to the gear member was performed as follows. A portion of the gear member of the produced bearing complex gear was secured, the bearing member was pressed from the gear member to one side of axial direction in which the bearing member is ejected from the gear member. Then, an ejection load generated in the ejection of the bearing member from gear member was measured. Regarding each sample, minimum and maximum of the election load (N), and unevenness (the difference between the maximum and the minimum) of the election load were shown in Table 1.

TABLE 1

| Sample No. | Maximal Height (μm) | Ejection Load (N) | | |
|---|---|---|---|---|
| | | Minimum | Maximum | Unevenness |
| 01 | 2.0 | 1000 | 1300 | 300 |
| 02 | 3.2 | 1370 | 1520 | 150 |
| 03 | 5.0 | 1465 | 1565 | 100 |
| 04 | 10.0 | 1600 | 1690 | 90 |
| 05 | 25.0 | 1655 | 1745 | 90 |
| 06 | 50.0 | 1705 | 1800 | 95 |
| 07 | 75.0 | 1750 | 1825 | 75 |
| 08 | 100.0 | 1735 | 1815 | 80 |
| 09 | 125.0 | 1600 | 1785 | 185 |

As shown in Table 1, in the sample 01 in which the maximal height of the inner circumferential surface of the gear member was less than 3.2 μm, the ejection load was low, and the unevenness was large. On the other hand, in the sample 02 in which the maximal height of the inner circumferential surface of the gear member was 3.2 μm, the ejection load was larger, the unevenness was nearly half of that of the sample 01, and the fixing property was improved. When the maximal height was higher, the ejection load increased, and the unevenness was smaller. However, in the sample 09 in which the maximal height of the inner circumferential surface of the gear member exceeded 100 μm, the ejection load was greatly decreased, and the unevenness was larger. From the above results, it was confirmed that the gear member should have a surface roughness of 3.2 to 100 μm at maximal height.

Example 2

In a production method for gear members of the example 2, the example 2 was different from the example 1 in that the surface roughness of the inner circumferential surface was 50 μm at maximal height, and except for this, the required number of the gear member of the example 2 were produced in the same manner as in the example 1.

In a production method for bearing members of the example 2, the example 2 was different from the example 1 in that the outer diameters of the bearing members were appropriately varied from 4.2 to 5.04 mm, and except for this, the required number of the bearing members of the example 2 were produced in the same manner as in the example 1. The all bearing members had inner diameters of 3 mm and porosities of 25%.

Bearing complex gears (samples 06 and 10 to 16) having different fitting conditions as shown in Table 2 were produced in the same manner as in example 1 such that the bearing members were fitted into the gear members. Since the sample 10 used the bearing member having the outer diameter of 5.04 mm and the sample 10 was thereby in an interference fit condition, as shown in FIG. 5, the bearing member was press-fitted and fixed into the fitting hole of the gear member.

A fixing test of the bearing member to the gear member was performed in the same manner as in the example 1. Regarding each sample, minimum and maximum of the election load (N), and unevenness (the difference between the maximum and the minimal) were obtained. The results were shown in Table 2.

TABLE 2

| Sample No. | Fitting Clearance (μm) | Fitting Condition | Ejection Load (N) | | |
|---|---|---|---|---|---|
| | | | Minimum | Maximum | Unevenness |
| 10 | −20 | Interference Fit | 1155 | 1790 | 635 |
| 11 | 0.01 | Clearance Fit | 1715 | 1800 | 85 |
| 06 | 20 | Clearance Fit | 1705 | 1800 | 95 |
| 12 | 50 | Clearance Fit | 1685 | 1780 | 95 |
| 13 | 100 | Clearance Fit | 1665 | 1760 | 95 |
| 14 | 200 | Clearance Fit | 1630 | 1735 | 105 |
| 15 | 300 | Clearance Fit | 1585 | 1700 | 115 |
| 16 | 400 | Clearance Fit | 1405 | 1645 | 240 |

As shown in Table 2, in the sample 10 in which the bearing member was press-fitted into the gear member in an interference condition, the ejection load was low, and the unevenness was large. In contrast, in the sample using clearance fit, the ejection loads was large. Even in the clearance fit cases, in the samples having fitting clearances of 300 μm or less, each ejection load was large, and each unevenness was small. However, in the sample 16 having the fitting clearance of more than 300 μm, the ejection load decreased, and the unevenness was large. From the above results, it was confirmed that the present invention, in which the bearing member fixes to the gear member in a clearance fit condition, is advantageous and the fitting clearance was desirably 300 μm or less even in clearance fit cases.

Example 3

In a production method for gear members of example 3, the required number of the same gear members as those of example 2, of which the surface roughness of the inner circumferential surface was 50 μm at maximal height, were produced.

In a production method for bearing members of the example 3, the example 3 was different from the example 1 in that the porosities of the bearing complex gears of sintered compact were appropriately varied, and except for this, the required number of the bearing members (Sample Nos. 17 to 23) of the example 3 were produced in the same manner as in the example 1. Porosities of the bearing members are shown in Table 3.

Bearing complex gears (samples 17 to 23) of the example 3 were produced in the same manner as in example 1 such that the bearing members were fitted into the gear members. In this case, the fitting clearance between the gear member and the bearing member was 20 μm in the same manner as in the example 1.

Machine oil corresponding to ISO VG 56 was impregnated into each sample as a lubricating oil. The bearing member was fitted into a shaft corresponding to JIS S 45C, and a gear of the sample was rotated at a sliding speed of 31 m/min at a load of 5 MPa. A torque in the rotation was measured by a torque sensor, and a frictional coefficient was examined. The results were shown in Table 3.

TABLE 3

| Sample | Porosity of Bearing Member % | Friction Coefficient | Notes |
|---|---|---|---|
| 17 | 3 | 0.21 | |
| 18 | 5 | 0.12 | |
| 19 | 10 | 0.10 | |
| 20 | 15 | 0.07 | |
| 21 | 20 | 0.07 | |
| 23 | 25 | 0.08 | |
| 22 | 30 | 0.12 | |
| 23 | 35 | — | Breakage in Handling of Sintered Compact |

As shown in Table 3, in the sample 17 of which the bearing member had a porosity of less than 5%, the pores were insufficient, and the lubricating oil could not be sufficiently supplied. Due to this, the frictional coefficient was large. On the other hand, in each sample of which the bearing member had a porosity of 5% or more, the supply of the lubricating oil was sufficiently performed, so that the frictional coefficient was low. However, in the sample 23 of which the bearing member had a porosity of more than 30%, the amount of the pores was too large, and the strength was lowered. Due to this, in handling of green compact, the sintered compact broke. From the above results, it was confirmed that the porosity of the bearing member should be 5 to 30%.

Example 4

Each housing of the example 4 was produced as follows. An ingot material was subjected to machining, so that a housing having a fitting hole having a diameter of 5 mm was produced. Each fitting hole of the housings was machined by varying machining conditions. The surface roughness was controlled to have maximal height shown in Table 4 by 10 pieces corresponding to each machining condition.

Each sintered bearing of the example 4 was produced as follows. 5 mass % of Sn powder was added to an electrolytic copper powder, so that a mixed powder was obtained. A zinc stearate was added to the mixed powder as compacting lubricant in the ratio of 0.8 weight part to 100 weight parts, so that a raw powder was obtained. The raw powder was compacted into a green compact having a shape of the following sintered bearing, and the green compact was sintered. As a result, sintered bearings were obtained by 90 pieces (9 (condition)× 10 (piece/condition)). Each sintered bearing had an outer diameter of 4.96 mm, an inner diameter of 3 mm, and a porosity of 25%.

Each bearing unit of the example 4 was produced as follows. The housings and the sintered bearings were set in a die apparatus as shown in FIG. 2A. In this case, according to the above size, it is obvious that the fitting clearance between the housing and the sintered bearing was 20 μm. Next, a pressure of 40 MPa was applied to the sintered bearing by the upper and lower punches in the axial direction, the sintered bearing was compressed, and the sintered bearing fixed to the inner circumferential surface of the housing, so that bearing units (samples 101 to 109) as shown in FIG. 5 were produced by 10 pieces.

A fixing test of the sintered bearing to the housing was performed as follows. The housing of the produced bearing unit was secured, and the sintered bearing was pressed in one side of axial direction in which the sintered bearing was ejected from the housing. Then, ejection loads generated in the ejection of the sintered bearing from housing were measured ten times. Regarding each sample, minimum and maximum of each election load (N), which was obtained by the above measuring 10 times, and unevenness (the difference between the maximum and the minimum) were shown in Table 4.

TABLE 4

| Sample | Maximal Height μm | Ejection Load (N) | | |
|---|---|---|---|---|
| | | Minimum | Maximum | Unevenness |
| 101 | 2.0 | 1000 | 1350 | 350 |
| 102 | 3.2 | 1385 | 1530 | 145 |
| 103 | 5.0 | 1470 | 1570 | 100 |
| 104 | 10.0 | 1605 | 1695 | 90 |
| 105 | 25.0 | 1660 | 1740 | 80 |
| 106 | 50.0 | 1705 | 1790 | 85 |
| 107 | 75.0 | 1745 | 1820 | 75 |
| 108 | 100.0 | 1730 | 1810 | 80 |
| 109 | 125.0 | 1595 | 1775 | 180 |

As shown in Table 4, in the sample 101 in which the maximal height of the inner circumferential surface of the housing was less than 3.2 μm, the ejection load was low, and the unevenness was large. On the other hand, in the sample 102 in which the maximal height of the inner circumferential surface of the housing was 3.2 μm, the ejection load was larger, the unevenness was nearly half of that of the sample 101, and the fixing strength was improved. As the maximal height of the surface roughness was higher, the ejection load was larger, and the unevenness was smaller. However, in the sample 109 in which the maximal height of the inner circumferential surface of the housing exceeded 100 μm, the ejection load greatly decreased, and the unevenness was larger. From the above results, it was confirmed that the gear member should have a surface roughness of 3.2 to 100 μm at maximal height.

Example 5

In a production method for housings of the example 5, the example 5 was different from the example 4 in that the surface roughness of the inner circumferential surface was 50 μm at maximal height, and except for this, the required number of the housings of the example 5 was produced in the same manner as in the example 4.

In a production method for sintered bearings of the example 5, the example 5 was different from the example 4 in that the outer diameters of the sintered bearings were appropriately varied from 4.2 to 5.04 mm, and except for this, the required number of the sintered bearings of the example 5 was produced in the same manner as in the example 4. The all bearing members had inner diameters of 3 mm and porosities of 25%.

Bearing units (samples 106 and 110 to 116) of the example 5 having different fitting conditions as shown in Table 5 were produced in the same manner as in example 4 such that the sintered bearings were fitted into the housings. Since the sample 110 using the sintered bearing having the outer diameter of 5.04 mm and the sample 110 was thereby in an interference fit condition, as shown in FIG. 7B, the sintered bearing was press-fitted and fixed into the fitting hole of the housing.

Fixing test of the sintered bearing to the housing was performed in the same manner as in the example 4. Regarding each sample, minimum and maximum of the election load (N), and unevenness (the difference between the maximum and the minimal) were obtained. The results are shown in Table 5.

TABLE 5

| Sample | Fitting Clearance (μm) | Fitting Condition | Ejection Load (N) | | |
|---|---|---|---|---|---|
| | | | Minimum | Maximum | Unevenness |
| 110 | −20 | Interference Fit | 1155 | 1785 | 630 |
| 111 | 0.01 | Clearance Fit | 1745 | 1825 | 80 |
| 106 | 20 | Clearance Fit | 1705 | 1790 | 85 |
| 112 | 50 | Clearance Fit | 1690 | 1785 | 95 |
| 113 | 100 | Clearance Fit | 1665 | 1760 | 95 |
| 114 | 200 | Clearance Fit | 1630 | 1740 | 110 |
| 115 | 300 | Clearance Fit | 1580 | 1700 | 120 |
| 116 | 400 | Clearance Fit | 1405 | 1650 | 245 |

As shown in Table 5, in the sample 110 in which the sintered bearing was fitted into the housing in a interference condition, the ejection load was low, and the unevenness was large. In contrast, in the samples using clearance fit, the ejection loads were large. Even in clearance fit cases, in the samples having fitting clearances of 300 μm or less, each ejection load was large, and each unevenness was small. However, in the sample 116 having the fitting clearance of more than 300 μm, the ejection load decreased, and the unevenness was large. From the above results, it was confirmed that the present invention, in which the sintered bearing fixes to the fitting hole of the housing in a clearance fit condition, is advantageous and the fitting clearance was desirably 300 μm or less even in clearance fit cases.

What is claimed is:
1. A production method for complex bearings, comprising:
preparing an outer member consisting of an Fe-based sintered material and a cylindrical sintered bearing member consisting of a Cu-based sintered material,
the outer member comprising a fitting hole having:
an almost circular cross section;
an inner peripheral surface; and
a surface roughness of the inner peripheral surface which is 3.2 to 100 μm at a maximal height,
the sintered bearing member comprising an outer diameter allowing a clearance fit of the sintered bearing member into the fitting hole of the outer member;
inserting the sintered bearing member into the fitting hole of the outer member and inserting a columnar core rod into an inner peripheral surface of the sintered bearing member; and
compressing the sintered bearing member in an axial direction, wherein
by the compressing, plastic deformation occurs in the sintered bearing member such that a material of the sintered bearing member flows toward a peripheral side thereof, and an expanding peripheral surface of the sintered bearing member is pressed onto the inner peripheral surface of the fitting hole of the outer member, and the outer member and the sintered bearing member are thereby integrated with each other, and
the inner peripheral surface of the sintered bearing member is pressed onto the columnar core rod, and a hole size of the fitting hole of the sintered bearing member is thereby adjusted.

2. A production method for complex bearings according to claim 1, wherein
the sintered bearing member has a porosity of 5 to 30%.

3. A production method for complex bearings according to claim 1, wherein
the clearance fit has a fitting size difference between an inner diameter of the fitting hole of the outer member and the outer diameter of the sintered bearing member, and the fitting size difference exceeds 0 and is 300 µm or less.

4. A production method for complex bearings according to claim 1, wherein
the sintered bearing member after the integrating with the outer member has a cylindrical shaft hole having a constant inner diameter.

5. A production method for complex bearings according to claim 1, wherein
the outer member composed of the Fe-based sintered material has a density ratio of 75 to 95%.

6. A production method for complex bearings according to claim 5, wherein
the inner peripheral surface of the fitting hole of the outer member is in a condition as sintered.

7. A production method for complex bearings according to claim 1, wherein
the outer member has first pores with a maximal pore diameter of 50 to 200 µm at a depth of at least 2 mm from the inner peripheral surface of the fitting hole, and amount of the first pores is 5 to 30% of overall pores of the outer member, wherein
the sintered bearing member has second pores with a maximal pore diameter of 5 to 100 µm, and amount of the second pores is 5 to 50% of overall pores of the sintered bearing member.

8. A production method for complex bearings according to claim 1, wherein
the sintered bearing member integrated with the outer member further comprises:
a shaft hole; and
an inner relief portion which is formed at an axial direction center portion of the shaft hole and the inner relief portion has a diameter larger than those of axial direction opposite portions of the sintered bearing member.

9. A production method for complex bearings according to claim 1, wherein
the complex bearing further comprises:
a plurality of the sintered bearing members, wherein
the plurality of the sintered bearing members are nearly coaxially fitted into the fitting hole of the outer member, and
the plurality of the sintered bearing members are compressed to tightly contact each other in an axial direction.

10. A production method for complex bearings according to claim 9, wherein
the plurality of the sintered bearing members further comprises:
contact surfaces contacting each other; and
shaft hole end portions which are proximate to the contact surfaces and the shaft hole end portions have inner diameters, wherein
the inner diameters of the shaft hole end portions are larger than those of other portions of the plurality of the sintered bearing members, and
the shaft hole end portions form an inner relief portion by contacting the inner diameters of the shaft hole end portions.

11. A production method for complex bearings according to claim 1, wherein
the outer member is a gear member which has a gear shape as an external shape, and
the fitting hole is formed at a center of the gear shape.

12. A production method for complex bearings according to claim 11, wherein
the outer member further comprises:
a tooth portion having a density ratio of 80% or more; and
a body portion having a density ratio of 75 to 95%.

* * * * *